United States Patent
Basu et al.

(10) Patent No.: US 11,392,859 B2
(45) Date of Patent: Jul. 19, 2022

(54) LARGE-SCALE AUTOMATED HYPERPARAMETER TUNING

(71) Applicant: Microsoft Technology Licensing, LLC, Redmond, WA (US)

(72) Inventors: Kinjal Basu, Stanford, CA (US); Chengming Jiang, Sunnyvale, CA (US); Yunbo Ouyang, Sunnyvale, CA (US); Josh Fleming, Atlanta, GA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 861 days.

(21) Appl. No.: 16/246,403

(22) Filed: Jan. 11, 2019

(65) Prior Publication Data

US 2020/0226496 A1    Jul. 16, 2020

(51) Int. Cl.
*G06N 20/20* (2019.01)
*G06F 17/18* (2006.01)
*G06F 11/34* (2006.01)

(52) U.S. Cl.
CPC ......... *G06N 20/20* (2019.01); *G06F 11/3466* (2013.01); *G06F 17/18* (2013.01)

(58) Field of Classification Search
CPC .. G06F 17/18; G06F 21/6254; G06F 11/3466; G06N 5/003; G06N 20/00; G06N 20/20; G06N 7/005
USPC ........................................................ 706/12
See application file for complete search history.

(56) References Cited

U.S. PATENT DOCUMENTS

| 10,528,891 | B1 * | 1/2020 | Cheng | G06F 17/10 |
| 2017/0372229 | A1 * | 12/2017 | Ura | G06N 20/00 |
| 2020/0019888 | A1 * | 1/2020 | McCourt | G06N 7/005 |

OTHER PUBLICATIONS

Bergstra, et al., "Algorithms for Hyper-Parameter Optimization", In the Proceedings of Proceedings of the 24th International Conference on Neural Information Processing Systems, Dec. 12, 2011, pp. 2546-2554.

(Continued)

*Primary Examiner* — John H Le
(74) *Attorney, Agent, or Firm* — Schwegman Lundberg & Woessner, P.A.

(57) ABSTRACT

Systems and methods determine optimized hyperparameter values for one or more machine-learning models. A sample training data set from a larger corpus of training data is obtained. Initial hyperparameter values are then randomly selected. Using the sample training data set and the randomly chosen hyperparameter values, an initial set of performance metric values are obtained. Maximized hyperparameter values are then determined from the initial set of hyperparameter values based on the corresponding performance metric value. A larger corpus of training data is then evaluated using the maximized hyperparameter values and the corresponding machine-learning model, which yields another corresponding set of performance metric values. The maximized hyperparameter values and their corresponding set of performance metric values are then merged with the prior set of hyperparameter values. The foregoing operations are performed iteratively until it is determined that the hyperparameter values are converging to a particular value.

20 Claims, 8 Drawing Sheets

(56) References Cited

OTHER PUBLICATIONS

Bergstra, et al., "Making a Science of Model Search: Hyperparameter Optimization in Hundreds of Dimensions for Vision Architectures", In the Proceedings of the 30th International Conference on International Conference on Machine Learning—vol. 28, Jun. 16, 2013, 9 Pages.

Bergstra, et al., "Random Search for Hyper-Parameter Optimization", The Journal of Machine Learning Research vol. 13 Issue 1, Jan. 3, 2012, pp. 281-305.

Feurer, et al., "Initializing Bayesian Hyperparameter Optimization via Meta-Learning", In the Proceedings of the Twenty-Ninth AAAI Conference on Artificial Intelligence, Jan. 25, 2015, pp. 1128-1135.

Hutter, et al., "Sequential Model-Based Optimization for General Algorithm Configuration", In the Proceedings of the 5th international conference on Learning and Intelligent Optimization, Jan. 17, 2011, pp. 507-523.

Kushner, H J., "A New Method of Locating the Maximum Point of an Arbitrary Multipeak Curve in the Presence of Noise", In the Journal of Basic Engineering | vol. 86 | Issue 1, Mar. 1, 1964, 10 Pages.

Neal, M. Radford., "Slice Sampling", In the Annals of Statistics 2003, vol. 31, No. 3, Jun. 25, 2003, 63 Pages.

Perrone, et al., "Scalable Hyperparameter Transfer Learning", In the Proceedings of 32nd Neural Information Processing Systems, 2018, 11 Pages.

Rasmussen, et al., "Gaussian Processes for Machine Learning", Retrieved From: http://www.gaussianprocess.org/gpml/chapters/RW.pdf, Nov. 23, 2005, 266 Pages.

Snoek, et al., "Practical Bayesian Optimization of Machine Learning Algorithms", In the Proceedings of the 25th International Conference on Neural Information Processing Systems—vol. 2, Dec. 3, 2012, pp. 2951-2959.

Snoek, et al., "Scalable Bayesian Optimization Using Deep Neural Networks", In the Proceedings of the 32nd International Conference on International Conference on Machine Learning—vol. 37, Jul. 6, 2015, 10 Pages.

Srinivas, et al., "Gaussian Process Optimization in the Bandit Setting: No Regret and Experimental Design", In the Proceedings of the 27th International Conference on International Conference on Machine Learning, Jun. 21, 2010, 8 Pages.

Thornton, et al., "Auto-WEKA: Combined Selection and Hyperparameter Optimization of Classification Algorithms", In the Proceedings of the 19th ACM SIGKDD international conference on Knowledge discovery and data mining, Aug. 11, 2013, 9 Pages.

Wilson, et al., "Deep Kernel Learning", Retrieved From: http://proceedings.mlr.press/v51/wilson16.pdf, Nov. 6, 2015, 9 Pages.

Wilson, et al., "Kernel Interpolation for Scalable Structured Gaussian Processes (KISS-GP)", In the Proceedings of the 32nd International Conference on International Conference on Machine Learning—vol. 37, Jul. 6, 2015, 10 Pages.

* cited by examiner

LARGE-SCALE AUTOMATED HYPERPARAMETER TUNING

TECHNICAL FIELD

The subject matter disclosed herein generally relates to machine-learning models and their associated hyperparameters and, in particular, to determining an initial set of hyperparameter values using an initial sample of a training data set, and then maximizing the initial set of hyperparameter values through repeated iterations of a complete training data set using the initial set of hyperparameter values.

BACKGROUND

Hyperparameter tuning is an important and challenging problem in the field of machine-learning since the model accuracy for a machine-learning model can vary drastically given different hyperparameters. In general, a hyperparameter is a parameter of a machine-learning model whose value is set before the learning process begins, and whose value cannot be estimated from the training data on which the machine-learning model is to operate.

In recent times, Bayesian Optimization (BO) has been used to address the problem of hyperparameter optimization. In most situations, hyperparameter optimization is framed as a black-box optimization problem:

$$\max_{x \in X} f(x) \qquad \text{(eq. 1)}$$

where:

$f$ is a black-box function that corresponds to model accuracy; and

X denotes the domain of the hyperparameters.

A Bayesian Optimization (BO) approach assumes a prior probabilistic model on the function $f$ and continues evaluating the function at different points in the domain X. With every new evaluation, the Bayesian Optimization approach tries to select the next best point so that the determined values of x slowly converge to a global maximizer x* of equation 1.

Given a sequence of point evaluations $\{(x_i, f(x_i))\}_{i=1}^{n}$, a conventional approach assumes a Gaussian Process (GP) prior on $f$ and generates the corresponding posterior GP. Using this posterior GP, an acquisition function is generated, which is maximized to generate the next best point $x_{n+1}$.

Under the conventional approach, a non-trivial number of scalability issues arise, especially when the Bayesian Optimization approach is assigned to perform a large number of function evaluations. Inference in a traditional GP-based BO is usually of order $O(n^3)$; thus, performing these function evaluations becomes prohibitively expensive computationally when there is a very large number of evaluations.

Accordingly, when presented with a large training data set, designing a machine-learning model with an optimal set of hyperparameter values becomes technically challenging as the time needed to train such a model grows exponentially with the training data set.

SUMMARY

To address these and other problems that arise within the field of machine-learning, this disclosure provides for one or more embodiments of a computing device that determines optimized hyperparameter values for one or more machine-learning models. The computing device (or set of computing devices) first obtains a sample training data set from a larger corpus of training data. The computing device then randomly selects one or more hyperparameter values from a domain of hyperparameter values. Using the sample training data set and the randomly chosen hyperparameter values, the computing device determines an initial set of quality metric values or performance metric values associated with the hyperparameter values.

The computing device then selects maximized hyperparameter values from the initial set of hyperparameter values based on the corresponding quality metric value or performance metric value. Thereafter, the computing device, then evaluates the larger corpus of training data using the maximized hyperparameter values. This evaluation results in another corresponding set of performance metric values. The maximized hyperparameter values and their corresponding set of performance metric values are then merged with the prior set of hyperparameter values. This merged set is then assigned as the next of hyperparameter values that the computing device is to evaluate using the larger corpus of training data. As discussed below with reference to FIG. 2 and FIGS. 3A-D, these operations are performed iteratively until the computing device determines that the hyperparameter values are converging to a particular value. When the computing device determines that the hyperparameter values are converging to the particular value (e.g., a predetermined percentage of the hyperparameter values are within a predetermined distance to the particular value), the computing device returns the hyperparameter values for each of the hyperparameters.

By using an initial set of hyperparameter values determined from a sample of the larger corpus of training data, the disclosed embodiments provide an improvement in the speed in which an optimal set of hyperparameter values are determined. In conventional approaches, the hyperparameter values are optimized using the larger corpus of training data rather than a selected sample of the training data. In using the larger corpus of training data, conventional approaches to optimizing hyperparameter values take an extraordinary amount of time and utilize a non-trivial amount of computing resources to do so. Where the larger corpus of training data includes millions of values, it can be impractical to optimize hyperparameter values using this corpus of training data in any meaningful amount of time (e.g., an amount of time where the results of optimizing the hyperparameter values would be useful). Accordingly, the disclosed embodiments present a technical solution to a technical problem that results in a measurable technical improvement.

BRIEF DESCRIPTION OF THE DRAWINGS

Some embodiments are illustrated by way of example and not limitation in the figures of the accompanying drawings.

DETAILED DESCRIPTION

Figure 1:
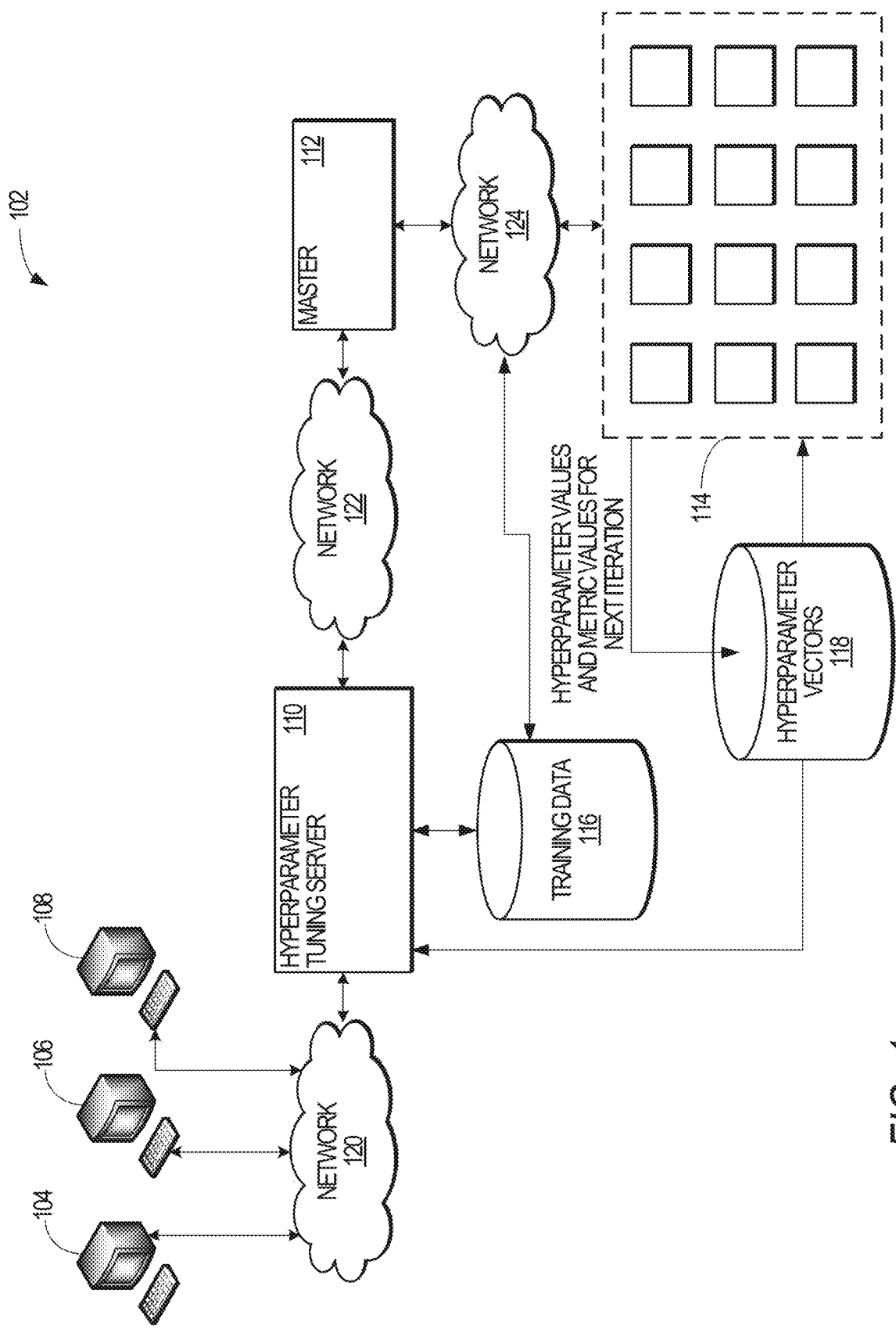
FIG. 1 is a diagram illustrating a hyperparameter tuning server in communication with various devices and systems for autotuning one or more hyperparameters according to an example embodiment.

The description that follows describes systems, methods, techniques, instruction sequences, and computing machine program products that illustrate example embodiments of the present subject matter. In the following description, for purposes of explanation, numerous specific details are set forth in order to provide an understanding of various embodiments of the present subject matter. It will be evident, however, to those skilled in the art, that embodiments of the present subject matter may be practiced without some or other of these specific details. Examples merely typify possible variations. Unless explicitly stated otherwise, structures (e.g., structural components, such as modules) are optional and may be combined or subdivided, and operations (e.g., in a procedure, algorithm, or other function) may vary in sequence or be combined or subdivided.

As noted above, a single function evaluation of a selected hyperparameter can be an expensive operation, where the cost of the operation is measured in time and computing resources. To address the costs associated with performing function evaluations using conventional approaches, the disclosed embodiments leverage the techniques employed in random search algorithms. Because some function evaluations are computationally expensive, the disclosed embodiments begin with a subsampling approach that drastically reduces the sample size. This allows parallel executions to run on a sub-sampled dataset using a relatively large number of quasi-random points from X (e.g., the domain of hyperparameters).

Using these points as prior data, the disclosed embodiments fit a GP model and estimate a posterior GP. These operations provide an initial idea of the surface $f(x)$, which is used in the BO procedure. Instead of searching in the overall domain of X, the disclosed approach shrinks the search space to a "ball" (e.g., one or more points having a predetermined distance) around the maximum of the mean function of the posterior GP.

For the purposes of this disclosure, the following notations and vocabulary is used throughout. Let x denote the vector of hyperparameters that lie in the domain $X \cdot \mathbb{R}^D$. After training a selected machine-learning model using x, let $f(x)$ denote a predetermined quality metric. As examples, $f(x)$ may be an Area under the Curve (AUC), negative Root Mean Square Error (RMSE), a normalized discounted cumulative gain (NDCG), or other such quality or performance metrics. Since many large-scale algorithms are randomized, it is assumed that $f(x)$ cannot be directly observed, but that a representation based on $f(x)$ can be observed, where the representation is defined as $y=f(x)+\varepsilon$, where $\varepsilon \sim N(0, \sigma^2)$.

The embodiments disclosed herein related to obtaining an optimal hyperparameter $x^*$, which is defined as $$x^* = \underset{x \in X}{\mathrm{argmax}} f(x) \quad \text{(eq. 2)}$$

One initial starting point for solving this particular problem is to use Bayesian Optimization. In general, BO is a sequential process for optimizing blackbox functions that typically involves two central tenants. First, a prior assumption is made about the function being optimized. In this disclosure, an assumption is made that a Gaussian process prior on $f$ due to its flexibility and ease of tractability. The second central tenant is that an acquisition function is constructed from the posterior of $f$, which is an explore-exploit criteria that facilitates selection of the next best point (e.g., the next best hyperparameter value) to evaluate.

In general, a Gaussian Process (GP) is a probability distribution over the space of functions. The GP is parameterized by a mean function $\mu(x)$ and a covariance kernel $k_\theta$ (x, x'): $X \times X \rightarrow \mathbb{R}$. In this regard, $\theta$ is a parameter for the kernel function k. A function $f$ is said to be following a GP $(\mu, k_\theta)$ if, for any n and $X=(x_1, x_2, \ldots, x_n)$:

$$f(X)=(f(x_1),f(x_2),\ldots,f(x_n))^T \sim N(\mu(x),K_\theta)$$

where $\mu(x)=(\mu(x_1),\mu(x_2),\ldots,\mu(x_n))^T$ and $K_\theta(i,j)=k_\theta(x_i,x_j)$. \quad (eq. 3)

In one embodiment, the prior distribution of $f$ is chosen as a GP with a zero mean and covariance kernel $k_\theta$. After observing the data $\{(x_n, y_n)\}$, the posterior of $f$ given the observed data is tractable and also follows a GP with the mean $\mu(x; \{(x_n, y_n)\}, \theta)$. Accordingly, the covariance kernel and the variance is given by the following set of equations:

$$\mu(x;\{(x_n,y_n)\},\theta):=k_n(x)^T(K_\theta+\sigma^2 I)^{-1}y \quad \text{(eq. 4)}$$

$$k(x,x';\{(x_n,y_n)\},\theta):=k_\theta(x,x')-k_n(x)^T(K_\theta+\sigma^2 I)^{-1}k_n(x') \quad \text{(eq. 5)}$$

$$\sigma^2(x;\{(x_n,y_n)\},\theta):=k(x,x;\{(x_n,y_n)\},\theta) \quad \text{(eq. 6)}$$

where $k_n(x)=(k_\theta(x_1, x), \ldots, k_\theta(x_n, x))^T$. The choice of the kernel function $k_\theta$ drives an assumption of how the function behaves. An example of common choices for the kernel function include the radial basis function (RBF) or the Matern kernel family of functions. Additional details on Gaussian Processes and kernel functions are described in the non-patent literature Rasmussen, el al., *Gaussian Processes for Machine Learning* (*Adaptive Computation and Machine Learning*), The MIT Press: 2005 ("Rasmussen"), which is incorporated by reference in its entirety.

Having observed the data and estimated the posterior GP, the next step is to identify the next hyperparameter value to evaluate. This is facilitated by the acquisition function, which usually depends on the parameters of the posterior GP, specifically through the mean, $\mu(\bullet; \{(x_n, y_n)\}, \theta)$ and the variance function $\sigma^2(\bullet; \{(x_n, y_n)\}, \theta)$. Examples of acquisition functions include, but are not limited to, the probability of improvement, an expected improvement, and GP-Upper Confidence Bounds. The forms of these types of functions are described with reference to the non-patent literature reference Snoek et al., *Practical Bayesian Optimization of Machine Learning Algorithms*, University of Toronto: 2012 ("Snoek"), which is incorporated by reference in its entirety.

In one implementation, the disclosed embodiments use an Expected Improvement (EI) (See Snoek) as an acquisition function since it is known in the art of machine-learning to behave better than other acquisition functions, such as the probability of improvement, and does not usually require further tuning parameters. Moreover, and in one embodiment, the disclosed systems and methods implement a full Bayesian approach by integrating out the kernel hyperparameters $\theta$ and working with the integrated acquisition function:

$$\hat{a}(x;\{(x_n,y_n)\})=\int a(x;\{(x_n,y_n)\},\theta)p(\theta|\{(x_n,y_n)\})d\theta \quad \text{(eq. 7)}$$

The above integral is approximated by a Markov Chain Monte Carlo (MCMC) approach using slice sampling and can be done in parallel. Based on the foregoing equations and assumptions, a conventional Bayesian Optimization approach is reproduced below in pseudo-algorithm form:

Algorithm 1
Bayesian Optimization for Black-Box Functions

| Input: | Function f, kernel $k_\theta$, Domain X |
|---|---|
| Output: | x*, the global maximum of f |
| 1: | Sample $x_0$ uniformly from X |
| 2: | Observe $y_0 = f(x_0) + \varepsilon$, where $1 \sim N(0, \sigma^2)$ |
| 3: | Assign $D_1 = \{(x_0, y_0)\}$ |
| 4: | for t = 1, 2, ... do |
| 5: |    Estimate the mean and kernel function of the posterior GP. |
| 6: |    Estimate the integrated acquisition function as in equation 7 (above). |
| 7: |    Choose $x_t = \mathrm{argmax}_{x \in X} \hat{a}(x; D_t)$ |
| 8: |    Obtain $y_t$ by evaluating the machine-learning model at $x_t$ using the corpus of training data. |
| 9: |    Assign $D_{t+1} = D_t \cup \{(x_t, y_t)\}$ |
| 10: |    Break the loop when $x_t$ converges to some x*. |
| 11: | end for |
| 12: | return x* |

While Algorithm 1 is functional and will eventually return a set of optimized hyperparameter values, Algorithm 1 is impractical where the corpus of training data is in the millions or billions of values. One example of such a corpus is in the realm of digital advertising, where an advertising may desire to know whether a user is likely to view or select a particular advertisement on a webpage. In this case, the machine-learning model is used to predict the likelihood that a given user selects a particular advertisement. The corpus of training data may include millions of users and the selections of advertisements corresponding to such users. Accordingly, this corpus of training data includes millions of data points that correlate users with advertisement selections. For this example, training a machine learning model according to Algorithm 1 using the corpus of training data is impractical as the time and computing resources needed to train the machine-learning model are greater than the time in which the results of such training are viable.

Accordingly, this disclosure provides for modifications to Algorithm 1 by way of a transfer learning approach and, more particularly, by transferring information from a highly subsampled dataset to the overall corpus of training data. The procedure starts by subsampling a predetermined amount of the training data (e.g., 5%, 8%, 10%, etc.) and searching randomly in the overall domain X.

In this regard, an initial set of hyperparameter values may be assigned $D_{prior}$, where $D_{prior} = \{(x_n, y_n)\}_{n=1}^N$, and $\{x_n\}$ is a sequence of quasi-Monte Carlo points within the domain X. The value of N is assigned a predetermined value large enough so that the modified algorithm can explore a substantial portion of the domain X: In addition, because of the small sample size on which the selected hyperparameter values are being executed, each of the evaluations may be executed in parallel. Thus, unlike Algorithm 1 (e.g., the conventional approach), obtaining this prior data set is computationally cheap.

Once $D_{prior}$ obtained, the modified algorithm begins by assigning an initial set of executions over the entirety of the corpus of the training data set using $D_{prior}$, where the first iteration of the modified algorithm uses $D_1 = D_{prior}$. Furthermore, the results of each iteration may not have the same mean as the overall dataset; thus, the modified algorithm removes bias by demeaning the prior set of results. Thus, $D_1$ may be written as:

$$D_1 = \{(x_n, y_n - \mu_{prior})\}_{n=1}^N, \text{ where} \quad (\text{eq. 7})$$

$$\mu_{prior} = \sum_{n=1}^N \frac{y_n}{N} \quad (\text{eq. 8})$$

The modified algorithm continuously updates the mean function of the overall dataset so that the modified algorithm obtains a consistent set of points within the domain X. The modified algorithm is presented below in pseudo-code as Algorithm 2:

Algorithm 2
Large-Scale Automatic Hyperparameter Tuning

| Input: | Function f, kernel $k_\theta$, Domain X, Parameters N, $\eta$, $\varepsilon$ |
|---|---|
| Output: | x*, the global maximum of f |
| 1: | Subsample $\eta$ % of the training data from the corpus of the training data. |
| 2: | Sample $(x_1, x_2, \ldots, x_N)$ quasi-Monte Carlo points from X. |
| 3: | Obtain prior data $D_{prior} = \{(x_n, y_n)\}_{n=1}^N$, where $D_{prior}$ may be obtained through parallel executions over $(x_n, y_n)$. |
| 4: | Assign $D_1 = \{(x_n, y_n - \mu_{prior})\}_{n=1}^N$ |
| 5: | for t = 1, 2, ... do |
| 6: |    Estimate the mean and kernel function of the posterior GP. |
| 7: |    Estimate the integrated acquisition function as in equation 7 (above). |
| 8: |    Choose $x_t = \mathrm{argmax}_{x \in X} \hat{a}(x; D_t)$ |
| 9: |    Obtain $y_t$ by evaluating the machine-learning model at $x_t$ using the corpus of training data. |
| 10: |    Assign $\mu_{new} = \frac{1}{t}\sum_{i=1}^t y_t$. |
| 11: |    Assign $D_{t+1} = D_{prior} \cup \{(x_t, y_t - \mu_{new})\}$ |
| 12: |    Break the loop when $x_t$ converges to some x*. |
| 13: | end for |
| 14: | return x* |

From the above algorithm, selecting $\eta$ is specific to the machine-learning model being implemented. In empirical trials, it has been observed that if $\eta$ is assigned values such that that n>>10p, satisfactory results are obtained while the overall accuracy of the machine-learning model is not significantly affected. In a majority of experimental circumstances, assigning ($\eta$=0.01) satisfied the above constraint and while obtaining non-trivial improvements in speed.

Turning now to FIG. 1 is a diagram of a networked architecture 102 having a hyperparameter tuning server 110 in communication with various devices 104-108 and systems 112-114 for autotuning one or more hyperparameters according to an example embodiment. The hyperparameter tuning server 110 provides server-side functionality via a network 120 (e.g., the Internet or wide area network (WAN)) to one or more client devices 104-108. The hyperparameter tuning server 110 is further communicatively coupled with one or more databases 116 that provide a corpus of training data for training a selected machine-learning model implementable by the hyperparameter tuning server 110 and executable by a master server 112.

The client devices 104-108 may comprise, but are not limited to, a mobile phone, desktop computer, laptop, portable digital assistants (PDAs), smart phone, tablet, ultra hook, netbook, laptop, multi-processor system, microprocessor-based or programmable consumer electronic, or any other communication device that a user may utilize to access the hyperparameter tuning server 110. In some embodiments, the client devices 104-108 may comprise a display module (not shown) to display information (e.g., in the form of user interfaces). In further embodiments, the client devices 104-108 may comprise one or more of touch screens, accelerometers, gyroscopes, cameras, microphones, global positioning system (GPS) devices, and so forth. The client devices 104-108 may be a device of a user that is used to interact with the hyperparameter tuning server 110 and to select various inputs for optimizing one or more machine-learning model hyperparameters.

In one embodiment, the hyperparameter tuning server 110 is a network-based appliance that responds to initialization requests or search queries from the client devices 104-108. One or more users of the client devices 104-108 may be a person, a machine, or other means of interacting with the client device 104-108. In various embodiments, the user is not part of the networked architecture 102, but may interact with the networked architecture 102 via one or more of the client devices 104-108 or another means.

The devices and systems of the networked architecture 102 may communicate using one or more networks 120-124, which may include one or more different types of networks. For example, one or more portions of the networks 120-124 may be an ad hoc network, an intranet, an extranet, a virtual private network (VPN), a local area network (LAN), a wireless LAN (WLAN), a wide area network (WAN), a wireless WAN (WWAN), a metropolitan area network (MAN), a portion of the Internet, a portion of the Public Switched Telephone Network (PSTN), a cellular telephone network, a wireless network, a Wi-Fi network, a WiMAX network, another type of network, or a combination of two or more such networks.

The client devices 104-108 may include one or more applications (also referred to as "apps") such as, but not limited to, a web browser, messaging application, electronic mail (email) application, a programmatic application, and the like. In some embodiments, if the programmatic application is included in one or more of the client devices 104-108, then this application is configured to locally provide the user interface and at least some of the functionalities with the application configured to communicate with the hyperparameter tuning server 110, on an as needed basis, for data and/or processing capabilities not locally available (e.g., access to a member profile, to authenticate a user 124, to identify or locate other connected members, etc.). Conversely, if the programmatic application is not included in one or more of the client devices 104-108, then the one or more client devices 104-108 may use its web browser to access the functionalities of the hyperparameter tuning server 110.

One or more users of the client devices 104-108 may be a person, a machine, or other means of interacting with the client devices 104-108. In example embodiments, the user is not part of the networked architecture 102, but may interact with the networked architecture 102 via the client devices 104-108 or other means. For instance, the user provides input (e.g., touch screen input or alphanumeric input) to one or more of the client devices 104-108 and the input is communicated to the networked architecture 102 via the network 120. In this instance, the hyperparameter tuning server 110, in response to receiving the input from the user, communicates information to one or more of the client devices 104-108 via the network 120 to be presented to the user. In addition, the hyperparameter tuning server 110 may communicate information to the master server 112 via a network 122. In this way, the user can interact with the hyperparameter tuning server 110 using one or more of the client devices 104-108.

Further, while the networked architecture 102 shown in FIG. 1 employs a client-server architecture, the present subject matter is of course not limited to such an architecture, and could equally well find application in a distributed, or peer-to-peer, architecture system, for example.

In addition to the client devices 104-108, the hyperparameter tuning server 110 communicates with a database 116 and a master server 112. The database 116 may be implemented as one or more types of databases including, but not limited to, a hierarchical database, a relational database, an object-oriented database, one or more flat files, or combinations thereof.

In one embodiment, the hyperparameter tuning server 110 communicates with the database 116 through one or more database server(s) (not shown). In this regard, the database server(s) provide one or more interfaces and/or services for providing content to, modifying content in, removing content from, or otherwise interacting with, the database 116. For example, and without limitation, such interfaces and/or services may include one or more Application Programming Interfaces (APIs), one or more services provided via a Service-Oriented Architecture ("SOA"), one or more services provided via a REST-Oriented Architecture ("ROA"), or combinations thereof. In an alternative embodiment, the hyperparameter tuning server 110 communicates with the database 110 and includes a database client, engine, and/or module, for providing data to, modifying data stored within, and/or retrieving data from, the database 116.

The database server(s) accessible by the hyperparameter tuning server 110 may include, but are not limited to, a Microsoft® Exchange Server, a Microsoft® SharePoint® Server, a Lightweight Directory Access Protocol ("LDAP") server, a MySQL database server, or any other server configured to provide access to the database 116, or combinations thereof.

The database 116 may include training data accessible by one or more systems of the networked architecture 102, such as the hyperparameter tuning server 110, the master server 112, and a server farm or collection of execution servers 114. Additionally, and/or alternatively, the database 116 may be populated with data from other systems and/or devices in communication with the networked architecture 102 (e.g., via the hyperparameter tuning server 110 or database server).

The training data stored by the database 116 may include labeled and/or unlabeled data used to train a machine-learning model selectable by the hyperparameter tuning server 110 and implementable by one or more of the execution servers 114. As one example, the labeled data may include anonymized user profiles and one or more specific behaviors associated with the anonymized user profiles. The user profiles are anonymized so as to protect the privacy of the associated users and to ensure that no personally identifiable information is associated with any one particular user profile.

In general, the behavior associated with an anonymized user profile indicates whether a user engaged in a particular course of action for a particular object. For example, the particular course of action may be whether the user selected a particular object. Examples of particular objects include, but is not limited to, a product advertisement, a service advertisement, a job offering, an educational opportunity, an article of interest, or other such particular object. In one embodiment, a particular object is a digital object that is displayed to a user via one or more of the client devices 104-108.

The training data may also include characteristics and/or attribute values for an anonymized user profile and/or a particular object. Examples of attribute values for an anonymized user profile include, but are not limited, whether the user is employed, the duration of employment (if applicable), the general geography where the user is employed, the user's prior behavior with respect to other particular objects, the number of times a user has selected a particular object or particular types of objects, and other such characteristics and/or attribute values.

Examples of attribute values for particular object include, but are not limited to, the type of particular object (e.g., product advertisement, job offering, article of interest, etc.), the intended audience of the particular object, the location on a webpage where the particular object was displayed, the number of days for which the particular object was to be displayed on a designated webpage, the size of the particular object, a general geographic location associated with the particular object (e.g., the general geography for employment if the particular object is a job offering), and other such characteristics and/or attribute values.

As evident by the foregoing examples, the training data can potentially include millions of data points depending on the composition of the training data. As explained above, conventional approaches to optimally tuning a set of hyperparameters for a particular machine-learning model can expend a significant amount of time and computing resources in determining the optimal values for the set of hyperparameters. As mentioned above with regard to Algorithm 2, the disclosed embodiments address this problem by sampling a predetermined amount of the training data stored in the database 116 and determining an initial set of hyperparameter values on which to execute over the entirety of the training data.

To execute a selected machine-learning model, the networked architecture 102 includes a master server 112 and a set of execution servers 114. In one embodiment, the master server 112 and/or the set of execution servers 114 are executed in a distributed fashion using the Apache Spark computation framework. As known in the art of distributed computing, Apache Spark is an open-source distributed general-purpose cluster-computing framework and is available from the Apache Software Foundation. Under this framework, and in one embodiment, the computation nodes for executing the machine-learning model are organized into two categories—a "driver" (e.g., the master server 112) and "executors" (e.g., the set of execution servers 114). In some instances, the master server 112 is implemented as a singleton node that orchestrates the computation, and the set of execution servers 114 apply transformations in parallel at the level of partitions of individual training examples. The individual results of each of the execution servers are then communicated (e.g., via the network 124) to the master server 112.

Within this framework, each of the execution servers of the set of execution servers 114 may perform a particular function evaluation (e.g., the performance metric being determined). In one embodiment, each function evaluation takes a set of hyperparameter values as input, evaluates on one or more of the execution servers, and reduces to a performance metric value on the master server 112. This performance metric value is the observed function evaluation for the given set of hyperparameters. Maximizing the hyperparameter values according to their corresponding performance metric values may be performed by the master server 112. In alternative embodiments, the maximizing of the hyperparameter values may be performed by the set of execution servers 114. As discussed below with reference to FIGS. 3A-3D, the master server 112 and/or set of execution servers 114 may implement one or more of the operations described in Algorithm 2, above.

Figure 2:
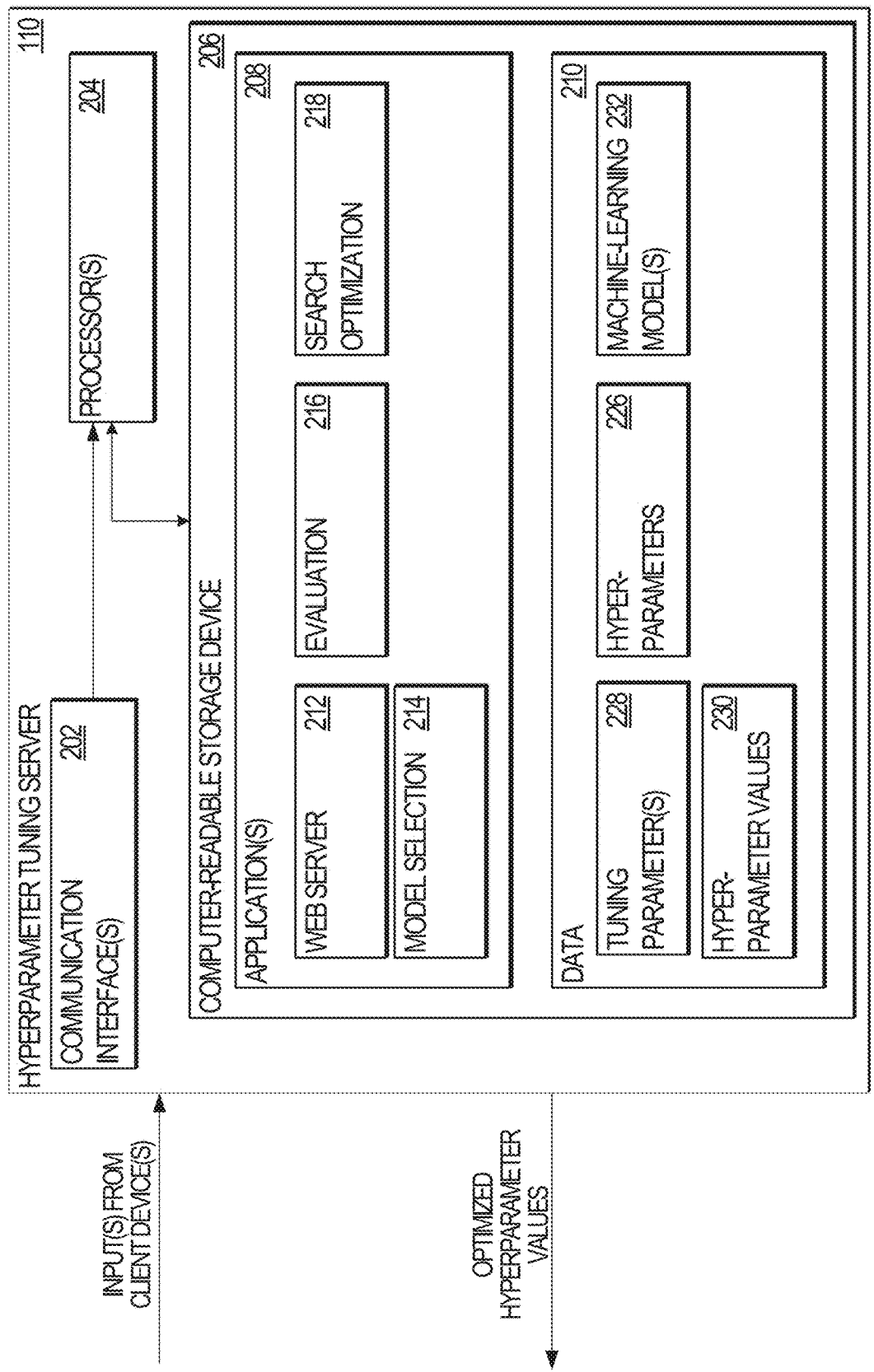
FIG. 2 illustrates the hyperparameter tuning server of FIG. 1 according to an example embodiment.

FIG. 2 illustrates the hyperparameter tuning server 110 of FIG. 1 in accordance with an example embodiment. In one embodiment, the hyperparameter tuning server 110 includes one or more processor(s) 204, one or more communication interface(s) 202, and a computer-readable storage device 206 that stores computer-executable instructions for one or more applications 208 and data 210 used to support one or more functionalities of the applications 208.

The various functional components of the hyperparameter tuning server 110 may reside on a single device or may be distributed across several computers in various arrangements. The various components of the networked communication server 110 may, furthermore, access one or more databases (e.g., database 116 or any of data 210), and each of the various components of the hyperparameter tuning server 110 may be in communication with one another. Further, while the components of FIG. 2 are discussed in the singular sense, it will be appreciated that in other embodiments multiple instances of the components may be employed.

The one or more processors 204 may be any type of commercially available processor, such as processors available from the Intel Corporation, Advanced Micro Devices, Texas Instruments, or other such processors. Further still, the one or more processors 204 may include one or more special-purpose processors, such as a Field-Programmable Gate Array (FPGA) or an Application Specific Integrated Circuit (ASIC). The one or more processors 204 may also include programmable logic or circuitry that is temporarily configured by software to perform certain operations. Thus, once configured by such software, the one or more processors 204 become specific machines (or specific components of a machine) uniquely tailored to perform the configured functions and are no longer general-purpose processors.

The one or more communication interfaces 202 are configured to facilitate communications between the hyperparameter tuning server 110, the one or more client devices 104-108, and one or more of the database server(s) and/or the database 116. The one or more communication interfaces 202 may include one or more wired interfaces (e.g., an Ethernet interface, Universal Serial Bus ("USB") interface, a Thunderbolt® interface, etc.), one or more wireless interfaces (e.g., an IEEE 802.11b/g/n interface, a Bluetooth® interface, an IEEE 802.16 interface, etc.), or combinations of such wired and wireless interfaces.

The computer-readable storage device 206 includes various applications 208 and data 210 for implementing the hyperparameter tuning server 110. The computer-readable storage device 206 includes one or more devices configured to store instructions and data temporarily or permanently and may include, but not be limited to, random-access memory (RAM), read-only memory (ROM), buffer memory, flash memory, optical media, magnetic media, cache memory, other types of storage (e.g., Erasable Programmable Read-Only Memory (EEPROM)) and/or any suitable combination thereof. The term "machine-readable medium"

should be taken to include a single medium or multiple media (e.g., a centralized or distributed database, or associated caches and servers) able to store the application(s) 208 and the data 210. Accordingly, the computer-readable storage device 206 may be implemented as a single storage apparatus or device, or, alternatively and/or additionally, as "cloud-based" storage systems or storage networks that include multiple storage apparatus or devices. As shown in FIG. 2, the computer-readable storage device 206 excludes signals per se.

In one embodiment, the applications 208 are written in a computer-programming and/or scripting language. Examples of such languages include, but are not limited to, C, C++, Java, JavaScript, Perl, Python, or any other computer programming and/or scripting language now known or later developed.

With reference to FIG. 2, the applications 208 of the hyperparameter tuning server 110 include, but are not limited to, a web server 212, a model selection application 214, an evaluation application 216, and a search optimization application 218. The data 210 referenced and used by the applications 208 include one or more tuning parameter(s) 228, one or more hyperparameter(s) 226, one or more machine-learning model(s) 232, and one or more hyperparameter value(s) 230.

The web server 212 is configured to provide access to, and interactions with, the hyperparameter tuning server 110. In one embodiment, the web server 212 provides one or more graphical user interfaces, which may be provided using the Hypertext Transfer Protocol (HTTP). Using the web server 212, a user of the client devices 104-108 may interact and communicate with the hyperparameter tuning server 110. Additionally and/or alternatively, the hyperparameter tuning server 110 may include a sever-side application that communicates with a client-side application residing on one or more of the client devices 104-108, and the user of the one or more client devices 104-108 communicates with the hyperparameter tuning server 110 via interactions between the server-side application and the client-side application.

The model selection application 214 is configured to provide one or more graphical user interfaces that allow the user of the one or more client devices 104-108 to select a machine-learning model from one or more machine-learning model(s) 232. Examples of trainable machine-learning model(s) 232 include, but are not limited to, Nearest Neighbor, Naïve Bayes, Decision Trees, Linear Regression, Support Vector Machines (SVM), and neural networks Furthermore, each of the trainable machine-learning model(s) 232 may be associated with one or more hyperparameters that define the corresponding machine-learning model. Examples of hyperparameters include, but are not limited to, a learning rate, a minimal loss reduction, maximal depth, minimum sum of instance weight for a child, subsample ratio, subsample ratio of columns for a tree, subsample ratio of columns for each split, and one or more regularization terms. In selecting a machine-learning model via the model selection application 214, the hyperparameter tuning server 110 may automatically select one or more hyperparameters 226 associated with the selected machine-learning model 232 to optimize. Additionally, and/or alternatively, a user may specify which of the hyperparameters 226 associated with a selected machine-learning model 232 to optimize.

The evaluation application 216 is configured to instruct the master server 112 to optimize one or more of the hyperparameters 226 for a selected machine-learning model 232. In addition, the evaluation application 216 may communicate one or more tuning parameter(s) 228 to the master server 112 that define the optimization parameters for optimizing the hyperparameters 226. For example, the tuning parameters 228 may include the predetermined sampling percentage value (e.g., the value of $\eta$), an upper limit value (e.g., the value of N), the performance metric and/or quality metric function to determine (e.g., $f(x)$), one or more values that define X, the kernel function $k_\theta$, or any combination thereof.

In addition, the tuning parameter(s) 228 may include parameters relating to whether the master server 112 is to determine that one or more of the hyperparameter values are converging on a particular value. For example, the tuning parameters may include a predetermined distance or convergence threshold and a predetermined convergence percentage. The predetermined distance or convergence threshold indicates a threshold value for determining whether a particular hyperparameter value is converging on a particular value. As discussed below, the master server 112 may determine whether a hyperparameter value is converging on a particular value by computing a difference between a current hyperparameter value and its prior hyperparameter value. This difference value may then be compared with the convergence threshold to determine whether the hyperparameter value is converging on a particular value.

The predetermined convergence percentage indicates the percentage of hyperparameter values that are to satisfy the convergence threshold for the master server 112 to affirmatively determine that the hyperparameter values have converged on corresponding values. In one embodiment, it may be sufficient for a majority of the hyperparameter values to be converging (e.g., 50%). In another embodiment, a user may desire that a supermajority of hyperparameter values have converged (e.g., 60%, 70%, 80%, etc.) on corresponding values. Accordingly, the predetermined convergence percentage may be configurable by the user (e.g., through the evaluation application 216), may be programmed as a default value into the master server 112 and/or the hyperparameter tuning server 110, or combinations thereof. In referring to Algorithm 2, above, the convergence threshold and the predetermined convergence percentage may be used by the master server 112 (or other computing device) at step twelve.

In one embodiment, the tuning parameters 228 and their corresponding values are predetermined. In another embodiment, the user may provide the hyperparameter tuning parameter server 110 with one or more tuning parameter values 228 via one or more client devices 104-108 and the evaluation application 216. Depending on the flexibility afforded to the user, the user may also select which of the tuning parameter value(s) that he or she will provide. In this manner, the hyperparameter tuning server 110 may include default values for one or more of the tuning parameter(s) 228, the user may provide one or more values for the tuning parameter(s) 228, or a combination of default values and user-provided values may be used in optimizing one or more of the hyperparameter(s) 226.

Using the tuning parameter values, the selected hyperparameter(s) 226, and a selected machine-learning model 232, the master server 112 instructs the one or more execution servers 114 to execute the kernel function and/or quality metric function over a sample of the training data selected from the database 116. As discussed above, the amount of training data to sample may be predetermined by the sampling percentage value $\eta$.

On a first iteration, the initial resulting quality metric values are temporarily stored as a baseline set of hyperparameter values and quality metric values. The master server 112 then instructs the one or more execution servers 114 to execute the kernel function and/or quality metric function over the entirety of the training data selected from the database 116 using the baseline set of hyperparameter values and corresponding quality metric values. As shown in Algorithm 2, there are several operations that finally result in a set of optimized set of hyperparameter vectors demeaned by a determined bias value. This optimized set is then merged with the prior set of hyperparameter values and corresponding quality metric values (shown as hyperparameter vectors 118 in FIG. 1). Through successive iterations using the hyperparameter vectors 118, the set of execution servers 114 determine a set of hyperparameter values and corresponding quality metric values that converge.

The search optimization application 218 may be configured to identify the best (e.g., optimized) hyperparameter vectors or regions within the domain X for further exploration. In one embodiment, the master server 112 communicates one or more hyperparameter vector(s) and/or values obtained from the set of execution servers 114 to the hyperparameter tuning server 110 to perform the search optimization. Additionally and/or alternatively, the master server 112 may implement the search optimization application 218.

In one embodiment, a random search implementation draws hyperparameter vectors directly from a Sobol generator and chooses a configuration with the best evaluation. In addition, a Gaussian process-based search implementation fits a Gaussian process to the observations to produce a predictive distribution over the hyperparameter evaluation space. It then passes the predictive distribution to an acquisition function implementation to identify the most promising regions of the domain space X. This process of observe-predict continues iteratively until a predetermined number of iterations have been reached. The predetermined number of iterations may be defined by one or more of the tuning parameters 228.

The result of the optimization process yields the hyperparameter value(s) 230. The hyperparameter tuning server 110 may then communicate the hyperparameter value(s) 230 to one or more of the client device(s) 104-108. The user may then use the hyperparameter value(s) 230 in implementing the corresponding machine-learning model selected from the machine-learning model(s) 232.

FIGS. 3A-3D illustrate a method 302, in accordance with an example embodiment, for optimizing one or more hyperparameters of a machine-learning model using the devices and systems illustrated in FIG. 1. The method 302 may be implemented with one or more of the devices, databases, and/or components shown in FIGS. 1-2 and is discussed by way of reference thereto. In addition, the method 302 may implement one or more of the operations shown in Algorithm 2.

Figure 3A:
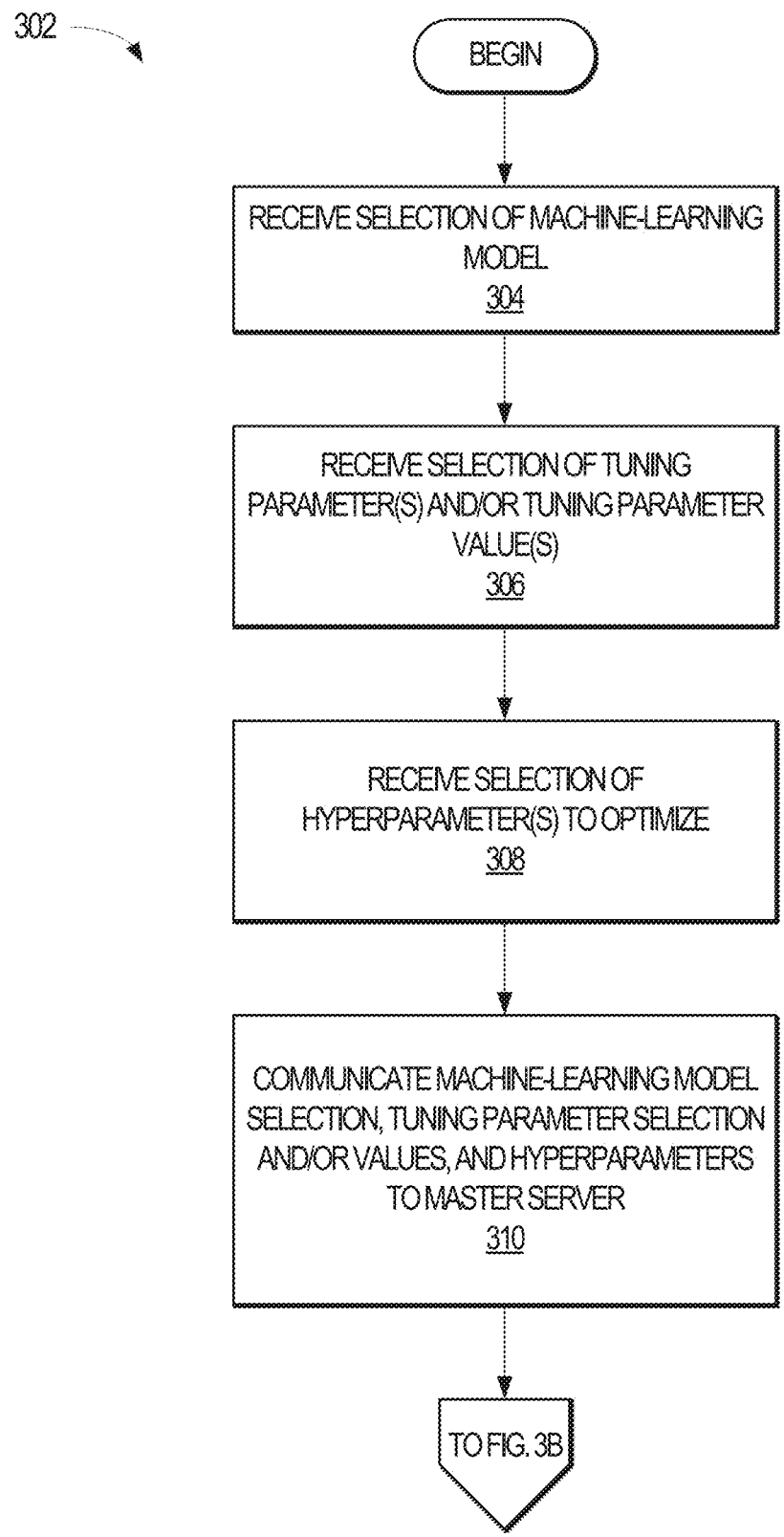
FIGS. 3A-3D illustrate a method, in accordance with an example embodiment, for optimizing one or more hyperparameters of a machine-learning model using the devices and systems illustrated in FIG. 1.

Referring initially to FIG. 3A, the hyperparameter tuning server 110 receives a selection of a machine-learning model (Operation 304). As discussed with reference to FIG. 2, the model selection application 214 may facilitate the selection of the machine-learning model through one or more graphical user interfaces displayed on one or more of the client devices 104-108.

The hyperparameter tuning server 110 then receives a selection of tuning parameters to use in optimizing the selected machine-learning model (Operation 306). The hyperparameter tuning server 110 may also receive one or more of the tuning values from the user via one or more client devices 104-108. Additionally and/or alternatively, the hyperparameter tuning server 110 may be preconfigured or programmed with default values for the tuning parameters 228. In some instances, the user may be unable to define or provide the values for the tuning parameters 228. As discussed above with reference to FIG. 2, examples of tuning parameters include the predetermined sampling percentage value (e.g., the value of $\eta$), an upper limit value (e.g., the value of N), the performance metric and/or quality metric function to determine (e.g., $f(x)$), one or more values that define X, the kernel function $k_\theta$, and a predetermined distance or convergence threshold.

The hyperparameter tuning server 110 may then receive a selection of one or more hyperparameters 226 to optimize (Operation 308). Accordingly, in one embodiment, the user selects or indicates which hyperparameter 226 to optimize. Additionally and/or alternatively, the hyperparameter tuning server 110 may be preconfigured or programmed to optimize particular hyperparameters.

The hyperparameters to optimize may be specific to the selected machine-learning model. Accordingly, depending on which machine-learning model is selected, the hyperparameter tuning server 110 may optimize different sets of hyperparameters. By way of example, and without limitation, examples of hyperparameters include a learning rate, a minimal loss reduction, maximal depth, minimum sum of instance weight for a child, subsample ratio, subsample ratio of columns for a tree, subsample ratio of columns for each split, and one or more regularization terms.

The hyperparameter tuning server 110 then communicates the selected machine-learning model, the tuning parameter values, and the hyperparameters to optimize to the master server 112 (Operation 310). In one embodiment, the hyperparameter tuning server 110 communicates this information to the master server 112 via the evaluation application 216, which may provide an interface between the hyperparameter tuning server 110 and the master 112.

Figure 3B:
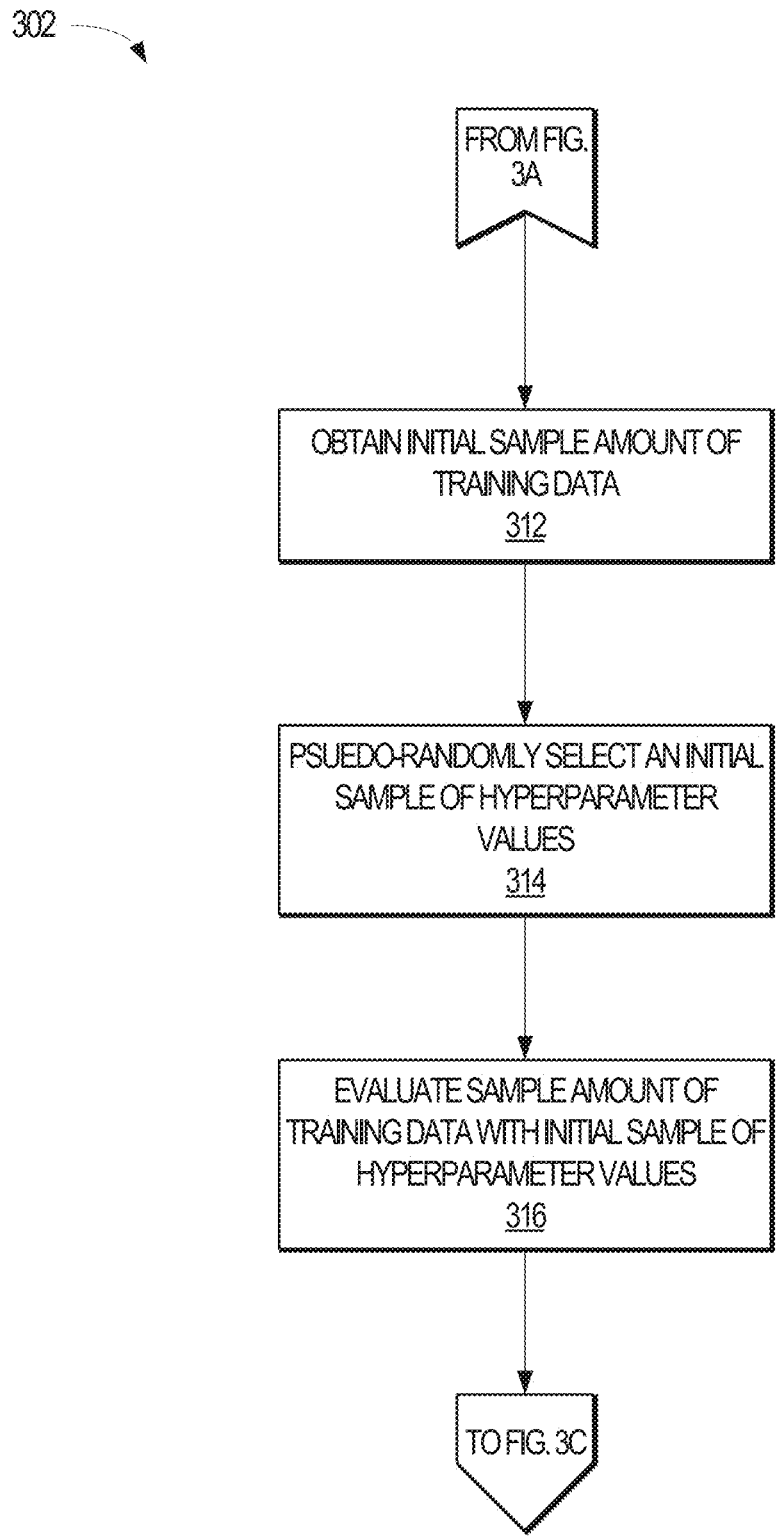

Referring next to FIG. 3B, the master server 112 may then determine the sub-sample of training data to retrieve from the database 116 (Operation 312). In one embodiment, Operation 312 corresponds to step one of Algorithm 2 (above). As discussed previously, the amount of training data to obtain from the database 116 may be defined by the tuning parameter $\eta$. The master server 112 may communicate with one or more of the execution servers 114 to obtain the sub-sample data from the database 116. As the master server 112 is configured to oversee the execution of the one or more of the execution servers 114, the master server 112 may instruct the training data that a particular execution server is to obtain. In some instances, the sub-sampled training data is the same for each of the execution servers 114. In other instances, one or more of the execution servers 114 are randomly assigned a sub-sample of the training data from the database 116.

The master server 112 then pseudo-randomly selects initial values for the hyperparameters (Operation 314). In one embodiment, Operation 314 corresponds to step two of Algorithm 2. As with Operation 312, the master server 112 may assign one or more of the initial values of the hyperparameters to one or more of the execution servers 114. In this fashion, the set of execution servers 114 may operate on the set of the initial hyperparameter values in parallel.

Accordingly, at Operation 316, the master 112 instructs the one or more execution servers 114 to obtain a particular $\{(x_n, y_n)\}$ using the sub-sampled training data, the sampled hyperparameter values, and the tuning parameter values received the hyperparameter tuning server 110. In one embodiment, Operation 316 corresponds to step three of Algorithm 2.

Figure 3C:
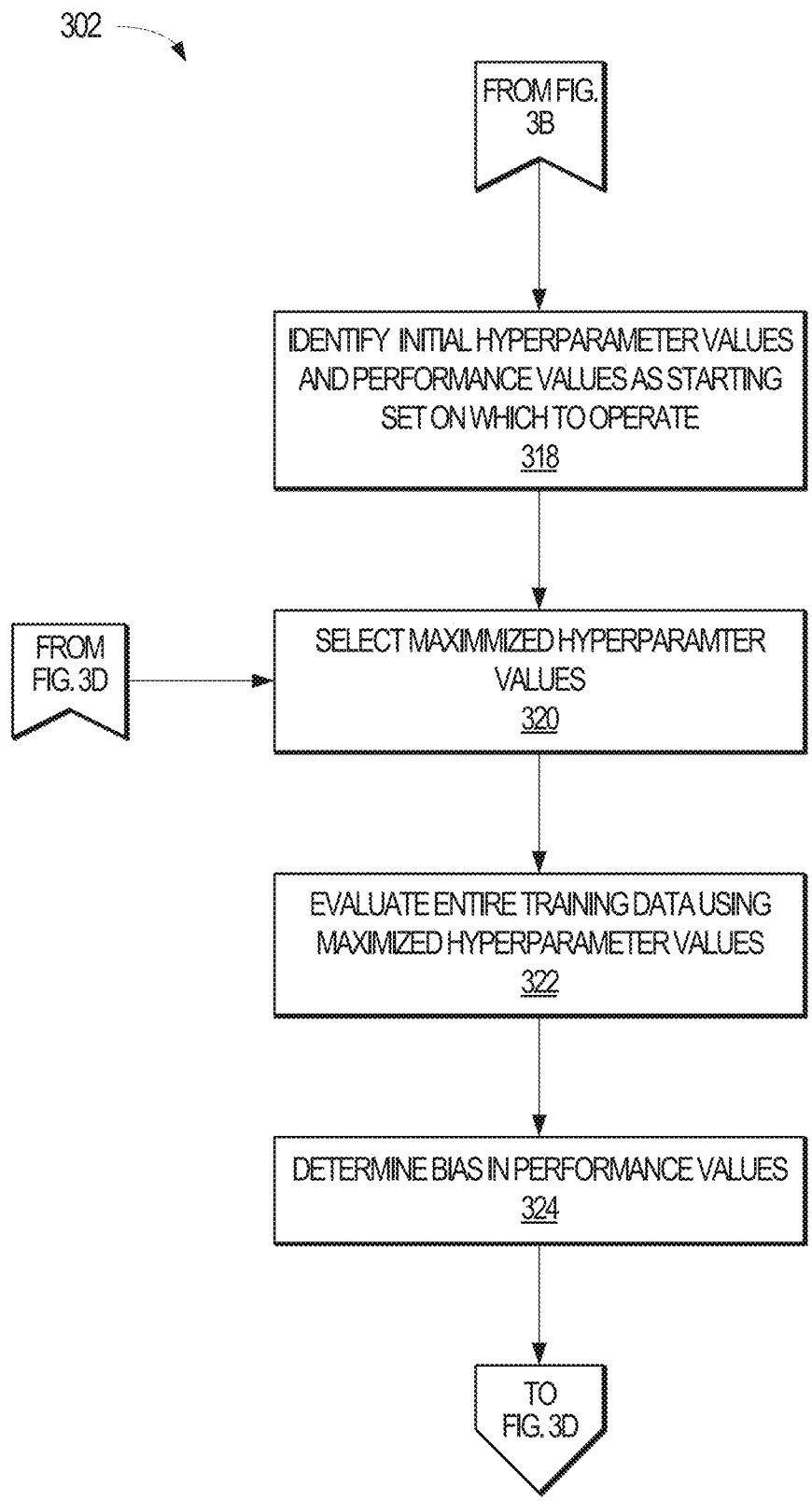

Referring to next FIG. 3C, the master server 112 then identifies an initial vector of hyperparameter values and performance metric values as a starting set of values on which the one or more execution servers 114 are to operate (Operation 318). In this regard, Operation 318 corresponds to step four of Algorithm 2. Thus, master server 112 assigns $D_1=\{(x_n, y_n-\mu_{prior})\}_{n=1}^N$, and the value of $D_1$ is distributed to each of the execution servers 114.

The master server 112 may then determine an initial optimized or maximized set of hyperparameter values from the previously determined set of hyperparameter values and corresponding performance metric values (Operation 320). Accordingly, and in one embodiment, Operation 320 corresponds to steps six through eight of Algorithm 2. In other words, the master server 112 may estimate the mean and kernel function of the posterior GP of $f$ and estimate the integrated acquisition function $â(x; \{(x_n, y_n)\})$. The master server 112 then determines a maximized vector of hyperparameter values, namely, $x_t=\operatorname{argmax}_{x \in X} â(x; D_t)$.

Beginning with Operation 320, the method 302 enters an iterative loop that searches for a maximized set of hyperparameter values. As discussed with reference to FIG. 3D, each successive iteration results in a merging of a maximized set of hyperparameter values with a prior set of hyperparameter values. This feature is illustrated in FIG. 1, where the one or more execution servers 114 output various hyperparameter values and their corresponding performance metric values, which are then merged with the prior set of hyperparameter values to result in a new (or next) set of hyperparameter vectors 118. The iterative loop ends when the master server 112 determines that the values of the hyperparameter vector $x_t$ are converging on corresponding values. In one embodiment, the convergence may be determined by comparing a difference value determined from a current hyperparameter value with its prior value, and a convergence threshold. In this manner, the comparison indicates whether a current hyperparameter value has changed from its prior value. If the change (e.g., the delta between the current hyperparameter value and the prior hyperparameter value) is above the convergence threshold, then it is likely that the hyperparameter value is still approaching a limit value. In one embodiment, this convergence threshold may be defined as one or more of the tuning parameter(s) 228. Furthermore, each of the hyperparameters of the vector $x_t$ may each be associated with a convergence threshold value.

Referring next to Operation 322, the master server 112 then instructs one or more of the execution servers 114 to determine corresponding $y_t$ values (e.g., performance metric values and/or quality metric values) for assigned values from $x_t$. In one embodiment, this operation corresponds to step nine of Algorithm 2. Accordingly, assuming that $x_t$ is a vector of hyperparameters, one or more of the execution servers may be assigned a particular hyperparameter to evaluate. Thus, in some instances, no one execution server is assigned multiple hyperparameters to evaluate. However, in instances, there may not be a sufficient number of execution servers 114 to evaluate the hyperparameters 226 substantially simultaneously and/or in parallel. Accordingly, there may be instances where one or more execution servers 114 are assigned more than one hyperparameter to evaluate.

In one embodiment, the one or more execution servers 114 communicate the performance metric values and/or quality metric values to the master server 112. Accordingly, at Operation 324, the master server 112 then determines a bias value $\mu_{new}$ from the received performance metric values and/or quality metric values. In this regard, Operation 324 corresponds to step 10 of Algorithm 2. As shown in Algorithm 2, $\mu_{new}$ is defined as $$\frac{1}{t}\sum_{i=1}^{t} y_t,$$

where t is the current iteration of Algorithm 2.

Figure 3D:
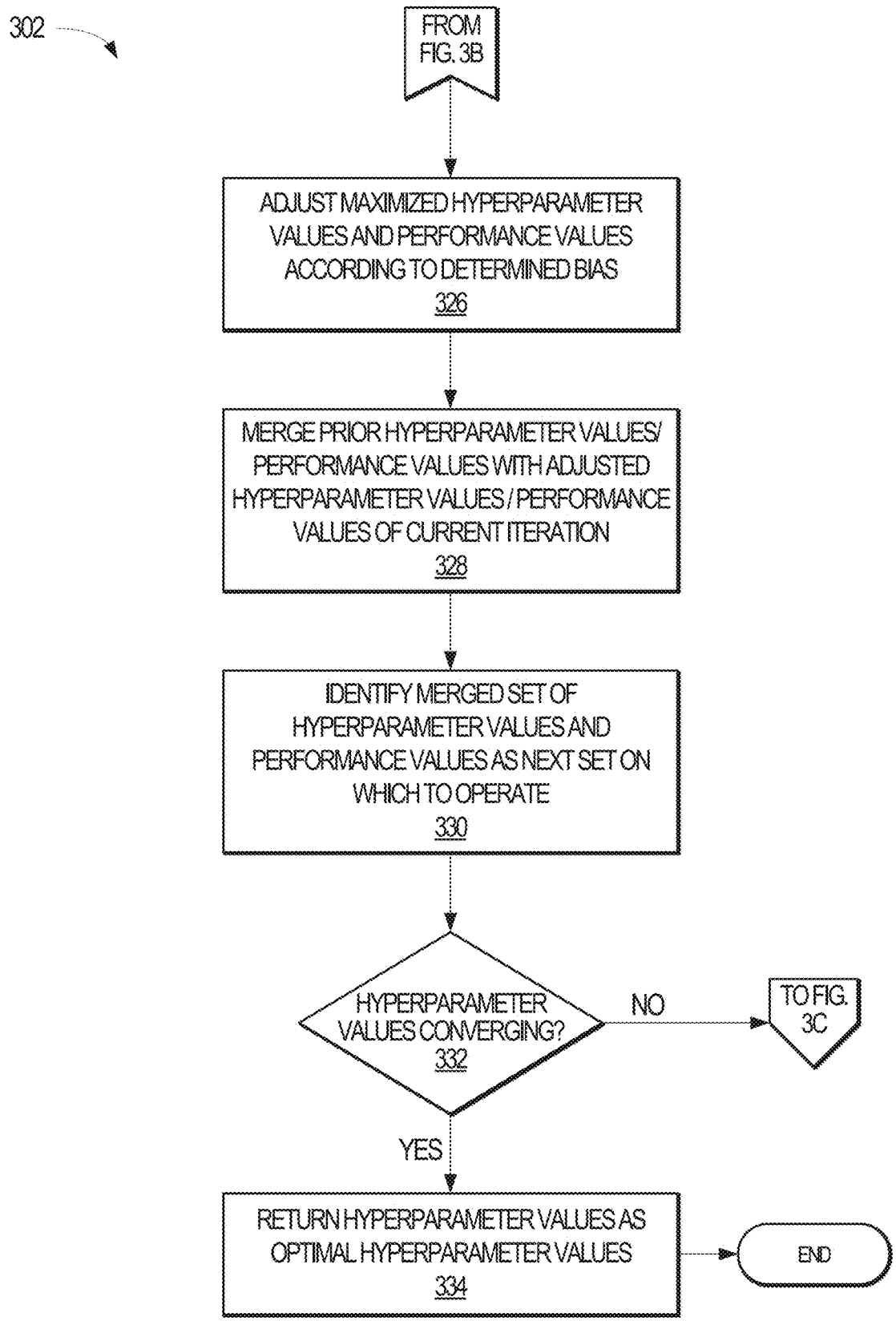

Referring to FIG. 3D, at operation 326, the master server 112 adjusts the hyperparameter values, the performance metric values, and/or quality metric values by the determined bias value. This adjusted set of values is then merged with the prior set of hyperparameter values and performance metric values and/or quality metric values (Operation 328). In one embodiment, Operations 326-328 correspond to step eleven of Algorithm 2.

At Operation 330, the master server 112 identifies the merged set of hyperparameter values and corresponding performance metric values as the next set of values to use in performing the next iteration of Operations 320-330. In this regard, Operation 330 corresponds to step twelve of Algorithm 2.

Next, at Operation 332, the master server 112 determines whether the current set of hyperparameter values are converging on a particular value. As discussed above, the master server 112 may determine this convergence by comparing one or more difference values with corresponding converging threshold values. In one embodiment, the master server 112 determines that the hyperparameter values are converging when a predetermined percentage of the hyperparameters (e.g., 80%) are associated with a difference value less than or equal to a corresponding convergence threshold value. The predetermined percentage of the hyperparameters may be stored as one or more of the tuning parameters 228. Where the master server 112 determines that the hyperparameter values are not converging (e.g., the "NO" branch of Operation 332), the method 302 returns to Operation 320 as shown in FIG. 3C. Alternatively, where the master server 112 determines that the hyperparameter values are converging (e.g., the "YES" branch of Operation 332), the method 302 proceeds to Operation 334, where the master server 112 returns the hyperparameter vector x* that includes optimized (e.g., maximized) hyperparameter values for corresponding hyperparameters to the hyperparameter tuning server 110. In one embodiment, the optimized hyperparameter values are stored as the hyperparameter values 230. Operation 334 may correspond to step fourteen of Algorithm 2.

Once stored as the hyperparameter values 230, the hyperparameter tuning server 110 may communicate one or more of the hyperparameter values 230 to one or more of the client devices 104-108. For example, the hyperparameter values 230 may be communicated via the web server 212 and using one or more web pages displayable by the one or more client devices 104-108. In this manner, the user is able to view and use the optimized hyperparameter values 230. In addition, the hyperparameter tuning server 110 may communicate one or more of the optimized hyperparameter values 230 to another computing device using a machine-learning model to which the optimized hyperparameter values 230 are applicable. For example, the hyperparameter tuning server 110 may communicate these hyperparameter values 230 using one or more of the networks 120-124, the web server 212, one or more of the communication interface(s) 202, or combinations thereof.

Empirical testing was performed using Algorithm 2 to confirm the improvements and benefits it provided. In one instance, Algorithm 2 was used to optimize a trimodal shekel function, which takes the following form:

$$f(x_1, x_2) = \frac{1}{2 + (x_1 - 1)^2 + (x_2 - 1)^2} + \frac{1}{2 + (x_1 - 1)^2 + (x_2 - 5)^2} + \frac{1}{1 + (x_1 - 5)^2 + (x_2 - 5)^2} \quad \text{(eq. 9)}$$

The global maximum is around 1.085, which is obtained at (5,5) but the function $f$ further has two local maximums. The testing on the trimodal shekel function included three methods: (1) Algorithm 1; (2) Algorithm 2 with ten prior random evaluations of $f(x_1, x_2)$; and (3) Algorithm 2 with 20 prior random evaluations of $f(x_1, x_2)$. The testing was repeated 25 times for each method and averaged over the accumulative largest evaluations.

Figure 4:
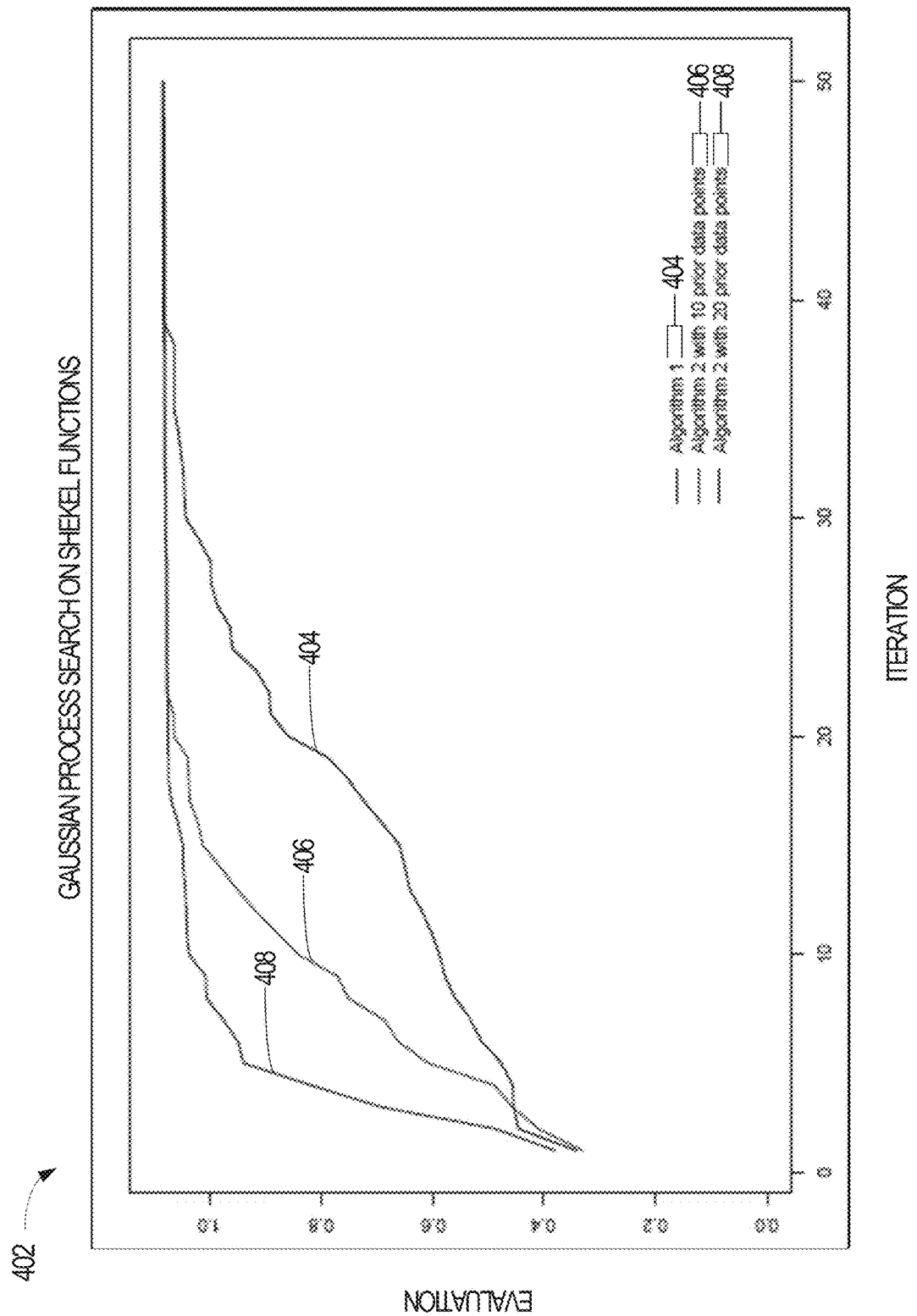
FIG. 4 illustrates a graph, in accordance with an example embodiment, demonstrating the improvements to speed that the disclosed systems and methods provide when compared with conventional approaches.

FIG. 4 illustrates a graph 402, in accordance with an example embodiment, demonstrating the improvements to speed that the disclosed systems and methods provide when compared with conventional approaches. Graph 402 plots the performance of optimizing the trimodal shekel function relative to the number of iterations needed to optimize the function. As shown in Graph 402, line 404 represents Algorithm 1, line 406 represents Algorithm 2 with ten prior data points (e.g., N=10), and line 408 represents Algorithm 2 with twenty prior data points (e.g., N=20). From graph 402, it can be seen that all three lines 404-408 eventually converge on a set of optimized hyperparameter values. However, it is readily apparent that line 408 approaches the optimized values with fewer iterations, which indicates that Algorithm 2 with twenty points obtains optimized hyperparameter values with fewer iterations than Algorithm 1. This feature translates into improvements in speed because executing approximately twenty iterations (e.g., the number of iterations used with Algorithm 2) requires less time to execute than executing approximately forty iterations (e.g., the number of iterations used with Algorithm 1). Thus, graph 402 demonstrates that the disclosed optimization systems and techniques result in measurable technical improvements in the field of machine-learning models.

In this manner, this disclosure provides systems and methods for optimizing the hyperparameters for a selected machine-learning model. In optimizing the hyperparameters, a hyperparameter tuning server provides one or more graphical user interfaces for a user to select the machine-learning model and various tuning parameters that define the methodology by which the hyperparameters for the selected machine-learning model are optimized. The hyperparameters are optimized by first obtaining a sub-sample of the training data used to train the machine-learning model, and then randomly selecting one or more values of the hyperparameters being optimized. Each hyperparameter being optimized may be associated with one or more values, where the number of values associated with the hyperparameter is a predetermined value.

In one embodiment, a master server coordinates with various execution servers to perform the optimization, where the master server (or one or more execution servers) evaluate a sub-sample of training data using the randomly selected hyperparameter values. The initial performance values and the randomly selected hyperparameter values form a baseline or starting point for the optimization. The master server then coordinates with the various execution servers to evaluate the entirety of the training data using the baseline hyperparameters. This evaluation is performed iteratively and, in each iteration, the master server selects hyperparameter values that maximized the performance values. These iterative executions are performed until the master server determines that the hyperparameter values are converging towards a particular value. When the master server determines that the hyperparameter values are converging, or have converged, the master server then returns a hyperparameter vector that includes the optimized hyperparameter value for each hyperparameter. As shown in FIG. 4, this methodology and implementation results in real-world improvements in the speed in which a machine-learning model can be trained with large data sets.

Modules, Components, and Logic

Certain embodiments are described herein as including logic or a number of components, modules, or mechanisms. Modules may constitute either software modules (e.g., code embodied on a machine-readable medium) or hardware modules. A "hardware module" is a tangible unit capable of performing certain operations and may be configured or arranged in a certain physical manner. In various example embodiments, one or more computer systems (e.g., a standalone computer system, a client computer system, or a server computer system) or one or more hardware modules of a computer system (e.g., a processor or a group of processors) may be configured by software (e.g., an application or application portion) as a hardware module that operates to perform certain operations as described herein.

In some embodiments, a hardware module may be implemented mechanically, electronically, or any suitable combination thereof. For example, a hardware module may include dedicated circuitry or logic that is permanently configured to perform certain operations. For example, a hardware module may be a special-purpose processor, such as a Field-Programmable Gate Array (FPGA) or an Application Specific integrated Circuit (ASIC). A hardware module may also include programmable logic or circuitry that is temporarily configured by software to perform certain operations. For example, a hardware module may include software executed by a general-purpose processor or other programmable processor. Once configured by such software, hardware modules become specific machines (or specific components of a machine) uniquely tailored to perform the configured functions and are no longer general-purpose processors. It will be appreciated that the decision to implement a hardware module mechanically, in dedicated and permanently configured circuitry, or in temporarily configured circuitry (e.g., configured by software) may be driven by cost and time considerations.

Accordingly, the phrase "hardware module" should be understood to encompass a tangible entity, be that an entity that is physically constructed, permanently configured (e.g., hardwired), or temporarily configured (e.g., programmed) to operate in a certain manner or to perform certain operations described herein. As used herein, "hardware-implemented module" refers to a hardware module. Considering embodiments in which hardware modules are temporarily configured (e.g., programmed), each of the hardware modules need not be configured or instantiated at any one instance in time. For example, where a hardware module comprises a general-purpose processor configured by software to become a special-purpose processor, the general-purpose processor may be configured as respectively different special-purpose processors (e.g., comprising different hardware modules) at different times. Software accordingly configures a particular processor or processors, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple hardware modules exist contemporaneously, communications may be achieved through signal transmission (e.g., over appropriate circuits and buses) between or among two or more of the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions described herein. As used herein, "processor-implemented module" refers to a hardware module implemented using one or more processors.

Similarly, the methods described herein may be at least partially processor-implemented, with a particular processor or processors being an example of hardware. For example, at least some of the operations of a method may be performed by one or more processors or processor-implemented modules. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an Application Program Interface (API)).

The performance of certain of the operations may be distributed among the processors, not only residing within a single machine, but deployed across a number of machines. In some example embodiments, the processors or processor-implemented modules may be located in a single geographic location (e.g., within a home environment, an office environment, or a server farm). In other example embodiments, the processors or processor-implemented modules may be distributed across a number of geographic locations.

Machine and Software Architecture

The modules, methods, applications and so forth described in conjunction with FIGS. 1-3D are implemented in some embodiments in the context of a machine and an associated software architecture. The sections below describe a representative architecture that is suitable for use with the disclosed embodiments.

Software architectures are used in conjunction with hardware architectures to create devices and machines tailored to particular purposes. For example, a particular hardware architecture coupled with a particular software architecture will create a mobile device, such as a mobile phone, tablet device, or so forth. A slightly different hardware and software architecture may yield a smart device for use in the "interne of things" while yet another combination produces a server computer for use within a cloud computing architecture. Not all combinations of such software and hardware architectures are presented here as those of skill in the art can readily understand how to implement the inventive subject matter in different contexts from the disclosure contained herein.

Example Machine Architecture and Machine-Readable Medium

Figure 5:
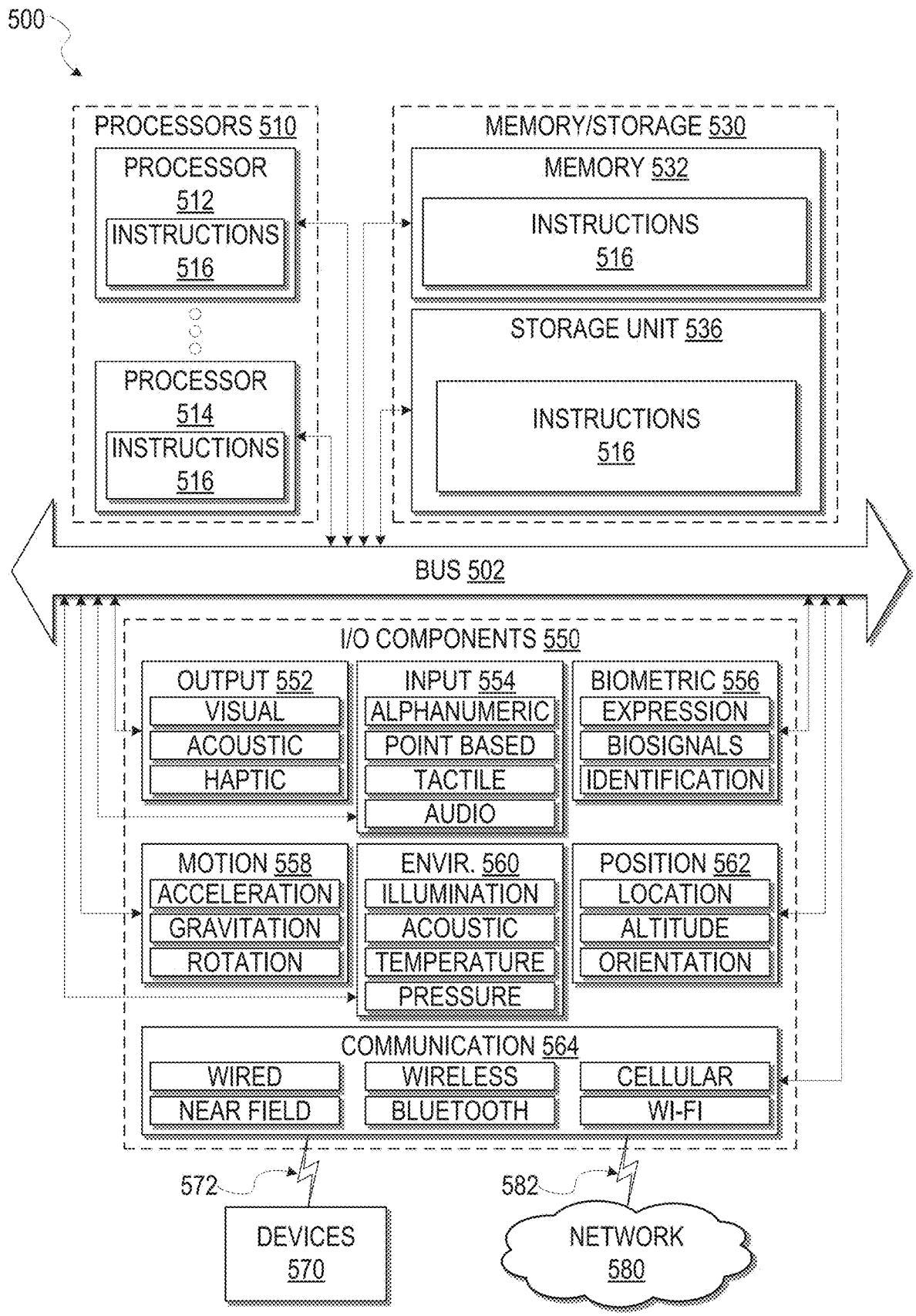
FIG. 5 is a block diagram illustrating components of a machine, according to some example embodiments, able to read instructions from a machine-readable medium (e.g., a machine-readable storage medium) and perform any one or more of the methodologies discussed herein.

FIG. 5 is a block diagram illustrating components of a machine 500, according to some example embodiments, able to read instructions from a machine-readable medium (e.g., a machine-readable storage medium) and perform any one or more of the methodologies discussed herein. Specifically, FIG. 5 shows a diagrammatic representation of the machine 500 in the example form of a computer system, within which instructions 516 (e.g., software, a program, an application, an applet, an app, or other executable code) for causing the machine 500 to perform any one or more of the methodologies discussed herein may be executed. For example, the instructions 516 may cause the machine 500 to execute the flow diagrams of FIGS. 3A-3D. Additionally, or alternatively, the instructions 516 may implement one or more of the components of FIG. 2. The instructions 516 transform the general, non-programmed machine 500 into a particular machine 500 programmed to carry out the described and illustrated functions in the manner described. In alternative embodiments, the machine 500 operates as a standalone device or may be coupled (e.g., networked) to other machines. In a networked deployment, the machine 500 may operate in the capacity of a server machine or a client machine in a server-client network environment, or as a peer machine in a peer-to-peer (or distributed) network environment. The machine 500 may comprise, but not be limited to, a server computer, a client computer, a personal computer (PC), a tablet computer, a laptop computer, a netbook, a personal digital assistant (PDA), or any machine capable of executing the instructions 516, sequentially or otherwise, that specify actions to be taken by machine 500. Further, while only a single machine 500 is illustrated, the term "machine" shall also be taken to include a collection of machines 500 that individually or jointly execute the instructions 516 to perform any one or more of the methodologies discussed herein.

The machine 500 may include processors 510, memory/storage 530, and I/O components 550, which may be configured to communicate with each other such as via a bus 502. In an example embodiment, the processors 510 (e.g., a Central Processing Unit (CPU), a Reduced Instruction Set Computing (RISC) processor, a Complex Instruction Set Computing (CISC) processor, a Graphics Processing Unit (GPU), a Digital Signal Processor (DSP), an Application Specific Integrated Circuit (ASIC), a Radio-Frequency Integrated Circuit (RFIC), another processor, or any suitable combination thereof) may include, for example, processor 512 and processor 514 that may execute the instructions 516. The term "processor" is intended to include multi-core processor that may comprise two or more independent processors (sometimes referred to as "cores") that may execute instructions 516 contemporaneously. Although FIG. 5 shows multiple processors 510, the machine 500 may include a single processor with a single core, a single processor with multiple cores (e.g., a multi-core process), multiple processors with a single core, multiple processors with multiples cores, or any combination thereof.

The memory/storage 530 may include a memory 532, such as a main memory, or other memory storage, and a storage unit 536, both accessible to the processors 510 such as via the bus 502. The storage unit 536 and memory 532 store the instructions 516 embodying any one or more of the methodologies or functions described herein. The instructions 516 may also reside, completely or partially, within the memory 532, within the storage unit 536, within at least one of the processors 510 (e.g., within the processor's cache memory), or any suitable combination thereof, during execution thereof by the machine 500. Accordingly, the memory 532, the storage unit 536, and the memory of processors 510 are examples of machine-readable media.

As used herein, "machine-readable medium" means a hardware device able to store instructions 516 and data temporarily or permanently and may include, but is not limited to, random-access memory (RAM), read-only memory (ROM), buffer memory, flash memory, optical media, magnetic media, cache memory, other types of storage (e.g., Erasable Programmable Read-Only Memory (EEPROM)) and/or any suitable combination thereof. The term "machine-readable medium" should be taken to include a single physical medium or multiple physical media (e.g., a centralized or distributed database, or associated caches and servers) able to store instructions 516. The term "machine-readable medium" shall also be taken to include any physical medium, or combination of multiple physical media, that is capable of storing instructions (e.g., instructions 516) for execution by a machine (e.g., machine 500), such that the instructions, when executed by one or more processors of the machine 500 (e.g., processors 510), cause the machine 500 to perform any one or more of the methodologies described herein. Accordingly, a "machine-readable medium" refers to a single storage apparatus or device, as well as "cloud-based" storage systems or storage networks that include multiple storage apparatus or devices. The term "machine-readable medium" excludes signals per se.

The I/O components 550 may include a wide variety of components to receive input, provide output, produce output, transmit information, exchange information, capture measurements, and so on. The specific I/O components 550 that are included in a particular machine will depend on the type of machine. For example, portable machines such as mobile phones will likely include a touch input device or other such input mechanisms, while a headless server machine will likely not include such a touch input device. It will be appreciated that the I/O components 550 may include many other components that are not shown in FIG. 5. The I/O components 550 are grouped according to functionality merely for simplifying the following discussion and the grouping is in no way limiting. In various example embodiments, the I/O components 550 may include output components 552 and input components 554. The output components 552 may include visual components (e.g., a display such as a plasma display panel (PDP), a light emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth.

The input components 554 may include alphanumeric input components (e.g., a keyboard, a touch screen configured to receive alphanumeric input, a photo-optical keyboard, or other alphanumeric input components), point based input components (e.g., a mouse, a touchpad, a trackball, a joystick, a motion sensor, or other pointing instrument), tactile input components (e.g., a physical button, a touch screen that provides location and/or force of touches or touch gestures, or other tactile input components), audio input components (e.g., a microphone), and the like.

In further example embodiments, the I/O components 550 may include biometric components 556, motion components 558, environmental components 560, or position components 562 among a wide array of other components. For example, the biometric components 556 may include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram based identification), and the like. The motion components 558 may include acceleration sensor components (e.g., accelerometer), gravitation sensor components, rotation sensor components (e.g., gyroscope), and so forth. The environmental components 560 may include, for example, illumination sensor components (e.g., photometer), temperature sensor components (e.g., one or more thermometer that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detection concentrations of hazardous gases for safety or to measure pollutants in the atmosphere), or other components that may provide indications, measurements, or signals corresponding to a surrounding physical environment. The position components 562 may include location sensor components (e.g., a Global Position System (GPS) receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 550 may include communication components 564 operable to couple the machine 500 to a network 580 or devices 570 via coupling 582 and coupling 572 respectively. For example, the communication components 564 may include a network interface component or other suitable device to interface with the network 580. In further examples, communication components 564 may include wired communication components, wireless communication components, cellular communication components, Near Field Communication (NFC) components, Bluetooth® components (e.g., Bluetooth® Low Energy), Wi-Fi® components, and other communication components to provide communication via other modalities. The devices 570 may be another machine or any of a wide variety of peripheral devices (e.g., a peripheral device coupled via a Universal Serial Bus (USB)).

Moreover, the communication components 564 may detect identifiers or include components operable to detect identifiers. For example, the communication components 564 may include Radio Frequency Identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF416, Ultra Code, UCC RSS-2D bar code, and other optical codes), or acoustic detection components (e.g., microphones to identify tagged audio signals). In addition, a variety of information may be derived via the communication components 564, such as location via Internet Protocol (IP) geo-location, location via Wi-Fi® signal triangulation, location via detecting a NFC beacon signal that may indicate a particular location, and so forth.

Transmission Medium

In various example embodiments, one or more portions of the network 580 may be an ad hoc network, an intranet, an extranet, a virtual private network (VPN), a local area network (LAN), a wireless LAN (WLAN), a wide area network (WAN), a wireless WAN (WWAN), a metropolitan area network (MAN), the Internet, a portion of the Internet, a portion of the Public Switched Telephone Network (PSTN), a plain old telephone service (POTS) network, a cellular telephone network, a wireless network, a Wi-Fi® network, another type of network, or a combination of two or more such networks. For example, the network 580 or a portion of the network 580 may include a wireless or cellular network and the coupling 582 may be a Code Division Multiple Access (CDMA) connection, a Global System for Mobile communications (GSM) connection, or other type of cellular or wireless coupling. In this example, the coupling 582 may implement any of a variety of types of data transfer technology, such as Single Carrier Radio Transmission Technology (1xRTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High Speed Packet Access (HSPA), Worldwide Interoperability for Microwave Access (WiMAX), Long Term Evolution (LTE) standard, others defined by various standard setting organizations, other long range protocols, or other data transfer technology.

The instructions 516 may be transmitted or received over the network 580 using a transmission medium via a network interface device (e.g., a network interface component included in the communication components 564) and utilizing any one of a number of well-known transfer protocols (e.g., hypertext transfer protocol (HTTP)). Similarly, the instructions 516 may be transmitted or received using a transmission medium via the coupling 572 (e.g., a peer-to-peer coupling) to devices 570. The term "transmission medium" shall be taken to include any intangible medium that is capable of storing, encoding, or carrying instructions 516 for execution by the machine 500, and includes digital or analog communications signals or other intangible medium to facilitate communication of such software.

Language

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Although an overview of the inventive subject matter has been described with reference to specific example embodiments, various modifications and changes may be made to these embodiments without departing from the broader scope of embodiments of the present disclosure. Such embodiments of the inventive subject matter may be referred to herein, individually or collectively, by the term "invention" merely for convenience and without intending to voluntarily limit the scope of this application to any single disclosure or inventive concept if more than one is, in fact, disclosed.

The embodiments illustrated herein are described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled.

As used herein, the term "or" may be construed in either an inclusive or exclusive sense. Moreover, plural instances may be provided for resources, operations, or structures described herein as a single instance. Additionally, boundaries between various resources, operations, modules, engines, and data stores are somewhat arbitrary, and particular operations are illustrated in a context of specific illustrative configurations. Other allocations of functionality are envisioned and may fall within a scope of various embodiments of the present disclosure. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of embodiments of the present disclosure as represented by the appended claims. The specification and drawings are, accordingly, to be regarded in an illustrative rather than a restrictive sense.

We claim:

1. A system comprising:
   a computer-readable storage device storing computer-executable instructions; and
   at least one hardware processor communicatively coupled to the computer-readable storage device that, when the computer-executable instructions are executed, configures the system to:
      sample a predetermined amount of training data from a corpus of training data to obtain sampled training data;
      select a predetermined number of hyperparameter values from a predetermined set of hyperparameter values to obtain an initial plurality of hyperparameter values, wherein each hyperparameter value of the initial plurality of hyperparameter values corresponds to at least one hyperparameter that defines a machine-learning model;
      evaluate the machine-learning model using the sampled training data and the initial plurality of hyperparameter values to obtain a plurality of corresponding performance metric values;
assign the initial plurality of hyperparameter values and their corresponding performance metric values as a baseline set of hyperparameter values;
assign the baseline set of hyperparameter values as a current set of hyperparameter values;
iteratively perform the following operations until the at least one hardware processor determines that at least one hyperparameter is converging on a particular hyperparameter value:
determine a maximized plurality of hyperparameter values based on the current set of hyperparameter values;
determine a corresponding performance metric value for each hyperparameter value of the maximized plurality of hyperparameter values based on applying the machine-learning model to the corpus of training data using at least one hyperparameter value of the maximized plurality of hyperparameter values;
merge the maximized plurality of hyperparameter values and their corresponding performance metric values with the baseline set of values to obtain a merged set of hyperparameter values; and
assign the merged set of hyperparameter values as the current set of hyperparameter values on which to perform the determination and merging operations; and
transmit the maximized plurality of hyperparameter values as optimal hyperparameter values for corresponding hyperparameters of the machine-learning model.

2. The system of claim 1, wherein the at least one hardware processor is further configured to:
determine a baseline bias value based on at least one performance metric value selected from the performance metric values associated with the baseline set of hyperparameter values; and wherein
the assignment of the baseline set of hyperparameter values as a current set of hyperparameter values comprises discounting at least one hyperparameter value of the baseline set of hyperparameter values by the determined baseline bias value.

3. The system of claim 1, wherein the at least one hardware processor is further configured to:
determine a current bias value based on a number of iterations performed and at least one performance metric value selected from the performance metric values associated with the maximized plurality of hyperparameter values; and wherein
at least one hyperparameter of the maximized plurality of hyperparameter values is discounted by the determined current bias value.

4. The system of claim 1, wherein the at least one hardware processor is further configured to:
estimate an integrated acquisition function based on at least one hyperparameter value selected from the current set of hyperparameter values and on at least one performance metric value associated with the at least one hyperparameter value; and wherein
the maximized plurality of hyperparameter values are further determined based on the estimated integrated acquisition function.

5. The system of claim 1, wherein the at least one hardware processor is further configured to receive a selection of the at least one hyperparameter that defines the machine-learning model.

6. The system of claim 1, wherein:
evaluation of the machine-learning model using the sampled training data and the initial plurality of hyperparameter values to obtain a plurality of corresponding performance metric values further comprises receiving a selection of a performance metric for which the plurality of corresponding performance metric values are obtained.

7. The system of claim 1, wherein:
evaluation of the machine-learning model using the sampled training data and the initial plurality of hyperparameter values to obtain a plurality of corresponding performance metric values is performed in parallel within a distributed computing architecture.

8. A method comprising:
sampling, by at least one hardware processor, a predetermined amount of training data from a corpus of training data to obtain sampled training data;
selecting, by the at least one hardware processor, a predetermined number of hyperparameter values from a predetermined set of hyperparameter values to obtain an initial plurality of hyperparameter values, wherein each hyperparameter value of the initial plurality of hyperparameter values corresponds to at least one hyperparameter that defines a machine-learning model;
evaluating, by the at least one hardware processor, the machine-learning model using the sampled training data and the initial plurality of hyperparameter values to obtain a plurality of corresponding performance metric values;
assigning, by the at least one hardware processor, the initial plurality of hyperparameter values and their corresponding performance metric values as a baseline set of hyperparameter values;
assigning, by the at least one hardware processor, the baseline set of hyperparameter values as a current set of hyperparameter values;
iteratively performing the following operations until the at least one hardware processor determines that at least one hyperparameter is converging on a particular hyperparameter value:
determining a maximized plurality of hyperparameter values based on the current set of hyperparameter values;
determining a corresponding performance metric value for each hyperparameter value of the maximized plurality of hyperparameter values based on applying the machine-learning model to the corpus of training data using at least one hyperparameter value of the maximized plurality of hyperparameter values;
merging the maximized plurality of hyperparameter values and their corresponding performance metric values with the baseline set of values to obtain a merged set of hyperparameter values; and
assigning the merged set of hyperparameter values as the current set of hyperparameter values on which to perform the determination and merging operations; and
transmitting the maximized plurality of hyperparameter values as optimal hyperparameter values for corresponding hyperparameters of the machine-learning model.

9. The method of claim 8, further comprising:
determining a baseline bias value based on at least one performance metric value selected from the performance metric values associated with the baseline set of hyperparameter values; and wherein
the assignment of the baseline set of hyperparameter values as a current set of hyperparameter values comprises discounting at least one hyperparameter value of the baseline set of hyperparameter values by the determined baseline bias value.

10. The method of claim 8, further comprising:
determining a current bias value based on a number of iterations performed and at least one performance metric value selected from the performance metric values associated with the maximized plurality of hyperparameter values; and wherein
at least one hyperparameter of the maximized plurality of hyperparameter values is discounted by the determined current bias value.

11. The method of claim 8, further comprising:
estimating an integrated acquisition function based on at least one hyperparameter value selected from the current set of hyperparameter values and on at least one performance metric value associated with the at least one hyperparameter value; and wherein
the maximized plurality of hyperparameter values are further determined based on the estimated integrated acquisition function.

12. The method of claim 8, wherein the at least one hardware processor is further configured to receive a selection of the at least one hyperparameter that defines the machine-learning model.

13. The method of claim 8, wherein:
evaluating the machine-learning model using the sampled training data and the initial plurality of hyperparameter values to obtain a plurality of corresponding performance metric values further comprises receiving a selection of a performance metric for which the plurality of corresponding performance metric values are obtained.

14. The method of claim 8, wherein:
evaluating the machine-learning model using the sampled training data and the initial plurality of hyperparameter values to obtain a plurality of corresponding performance metric values is performed in parallel within a distributed computing architecture.

15. A computer-readable storage device storing computer-executable instructions that, when executed by at least one hardware processor, causes a system to perform a plurality of operations comprising:
sampling a predetermined amount of training data from a corpus of training data to obtain sampled training data;
selecting a predetermined number of hyperparameter values from a predetermined set of hyperparameter values to obtain an initial plurality of hyperparameter values, wherein each hyperparameter value of the initial plurality of hyperparameter values corresponds to at least one hyperparameter that defines a machine-learning model;
evaluating the machine-learning model using the sampled training data and the initial plurality of hyperparameter values to obtain a plurality of corresponding performance metric values;
assigning the initial plurality of hyperparameter values and their corresponding performance metric values as a baseline set of hyperparameter values;
assigning the baseline set of hyperparameter values as a current set of hyperparameter values;
iteratively performing the following operations until the at least one hardware processor determines that at least one hyperparameter is converging on a particular hyperparameter value:
determining a maximized plurality of hyperparameter values based on the current set of hyperparameter values;
determining a corresponding performance metric value for each hyperparameter value of the maximized plurality of hyperparameter values based on applying the machine-learning model to the corpus of training data using at least one hyperparameter value of the maximized plurality of hyperparameter values;
merging the maximized plurality of hyperparameter values and their corresponding performance metric values with the baseline set of values to obtain a merged set of hyperparameter values; and
assigning the merged set of hyperparameter values as the current set of hyperparameter values on which to perform the determination and merging operations; and
transmitting the maximized plurality of hyperparameter values as optimal hyperparameter values for corresponding hyperparameters of the machine-learning model.

16. The computer-readable storage device of claim 15, wherein:
the plurality of operations further comprise determining a baseline bias value based on at least one performance metric value selected from the performance metric values associated with the baseline set of hyperparameter values; and
the assignment of the baseline set of hyperparameter values as a current set of hyperparameter values comprises discounting at least one hyperparameter value of the baseline set of hyperparameter values by the determined baseline bias value.

17. The computer-readable storage device of claim 15, wherein:
the plurality of operations further comprise determining a current bias value based on a number of iterations performed and at least one performance metric value selected from the performance metric values associated with the maximized plurality of hyperparameter values; and
at least one hyperparameter of the maximized plurality of hyperparameter values is discounted by the determined current bias value.

18. The computer-readable storage device of claim 15, wherein:
the plurality of operations further comprise estimating an integrated acquisition function based on at least one hyperparameter value selected from the current set of hyperparameter values and on at least one performance metric value associated with the at least one hyperparameter value; and
the maximized plurality of hyperparameter values are further determined based on the estimated integrated acquisition function.

19. The computer-readable storage device of claim 15, wherein:
evaluation of the machine-learning model using the sampled training data and the initial plurality of hyperparameter values to obtain a plurality of corresponding performance metric values further comprises receiving a selection of a performance metric for which the plurality of corresponding performance metric values are obtained.

20. The computer-readable storage device of claim 15, wherein:
   evaluation of the machine-learning model using the sampled training data and the initial plurality of hyperparameter values to obtain a plurality of corresponding performance metric values is performed in parallel within a distributed computing architecture.

* * * * *